United States Patent
Behm et al.

(10) Patent No.: US 7,144,061 B1
(45) Date of Patent: Dec. 5, 2006

(54) RETRACTABLE WINDSHIELD AND COLLAPSIBLE CONSOLE

(75) Inventors: Jim Behm, Eagle River, WI (US); Patricia Strutz, Eagle River, WI (US)

(73) Assignee: Vanco, Inc., Eagle River, WI (US)

( * ) Notice: Subject to any disclaimer, the term of this patent is extended or adjusted under 35 U.S.C. 154(b) by 117 days.

(21) Appl. No.: 10/946,784

(22) Filed: Sep. 22, 2004

(51) Int. Cl.
*B60J 1/02* (2006.01)

(52) U.S. Cl. .............. 296/96.11; 296/84.1; 296/95.1; 296/96; 296/24.34; 296/96.21; 114/361

(58) Field of Classification Search .............. 296/84.1, 296/95.1, 96, 96.11, 24.34, 96.21, 78.1, 89, 296/37.12, 85, 92, 180, 180.1; 114/361; 224/482, 483, 282
See application file for complete search history.

(56) References Cited

U.S. PATENT DOCUMENTS

| | | | |
|---|---|---|---|
| 2,308,109 A | 1/1943 | Rundquist | |
| 2,635,916 A | 4/1953 | Hammond | |
| 3,848,921 A | 11/1974 | Rhodes | |
| 4,353,590 A | 10/1982 | Wei-Chuan | |
| 4,957,056 A | 9/1990 | Martin | |
| 5,505,156 A | 4/1996 | Briggs | |
| 5,743,589 A * | 4/1998 | Felker | 296/180.5 |
| 5,857,727 A | 1/1999 | Vetter | |
| 5,947,052 A | 9/1999 | Deising | |
| 6,098,196 A | 8/2000 | Logan | |
| 6,302,440 B1 * | 10/2001 | Goodstein | 280/762 |
| 6,505,877 B1 | 1/2003 | Devlin et al. | |
| 2002/0046691 A1 | 4/2002 | Schmitt et al. | |

* cited by examiner

Primary Examiner—Lori L. Coletta
(74) Attorney, Agent, or Firm—Lathrop & Clark LLP

(57) ABSTRACT

A retractable windshield and collapsible console apparatus can be raised and the windshield extended when needed to afford additional protection to persons from conditions due to environment, and to allow for convenient and safe stowing of the apparatus in the same location without causing an obstruction. The console can be collapsed and stowed into a position which is substantially parallel relative to a base on the floor or other surface of a boat, other vehicle or other structure when not in use.

18 Claims, 17 Drawing Sheets

FIG. 25
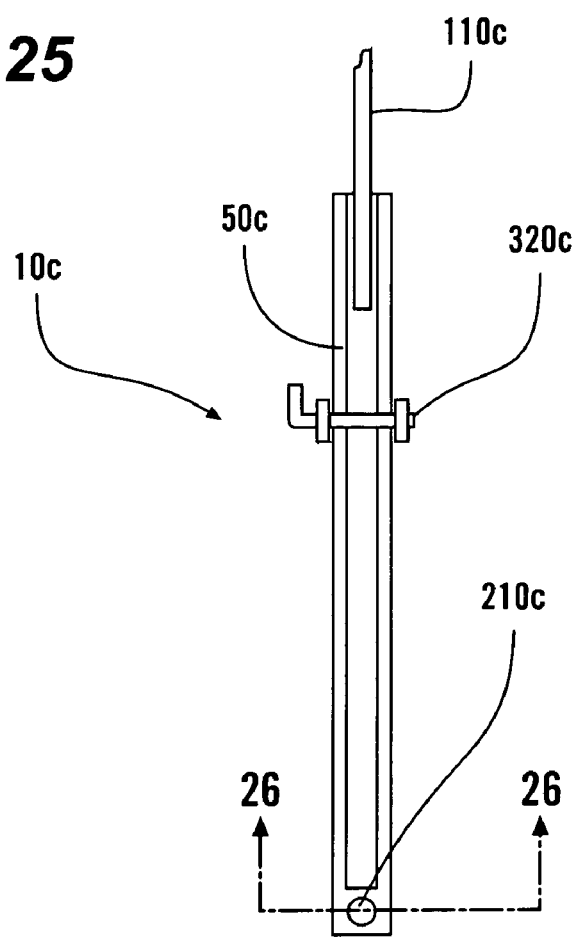
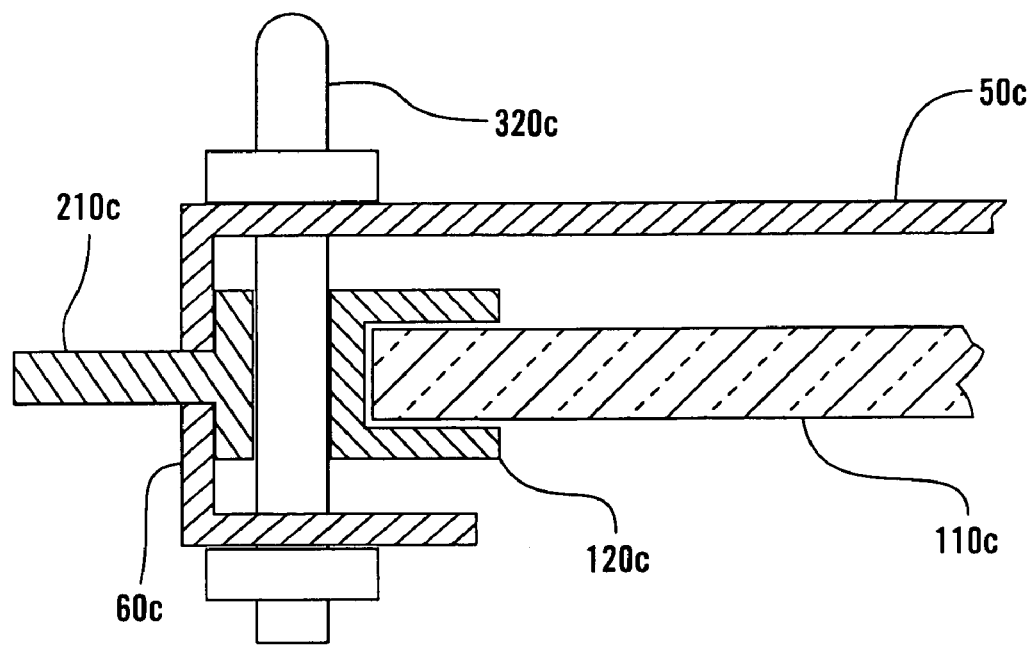
FIG. 26

RETRACTABLE WINDSHIELD AND COLLAPSIBLE CONSOLE

The present invention relates generally to the field of windshields, and in particular, windshields for vehicles such as boats. More specifically, the present invention relates to a retractable windshield, accompanied by a collapsible console, which can be conveniently, quickly and safely deployed and stowed in the same location without causing an obstruction when not in use.

BACKGROUND OF THE INVENTION

Many vehicles, particularly boats, provide windshield protection for only one occupant of the vehicle and/or do not provide protection during travel for passengers in the vehicle from exposure to conditions due to weather or the speed of operation of the vehicle, such as wind or water spray. A number of vehicles do not provide any protection to occupants. Exposure to such conditions can be unpleasant and uncomfortable for occupants of these vehicles. As a consequence, a need exists for a windshield that could be employed to provide this protection for vehicle occupants.

There have been devices in the past that have provided windshield protection. Although useful, these devices have generally been cumbersome and time consuming to install and operate and are not easily stowed in the same location, or elsewhere, such that mobility throughout the vehicle is not obstructed by the device when not in use.

U.S. Pat. No. 2,308,109 to Rundquist discloses a collapsible wind-spray shield for boats that is secured to the deck of a boat with bracket means and folded and stored elsewhere when not in use. Unlike the Rundquist invention, the present invention may be quickly and easily deployed and stowed. Also, unlike the Rundquist invention, the present invention may be collapsed and stowed in the same place in which it operates, or may be removed when not in use. Also, unlike the present invention, the Rundquist invention does not protect the windshield from exposure to weather conditions, or wear from being walked upon or other damage when not in use.

U.S. Pat. No. 6,505,877 to Devlin et al. discloses a portable two-piece windshield for motorcycles. The windshield is composed of an upper windshield panel, a lower windshield panel and a pair of connector brackets for releasably attaching the assembled windshield to the handlebars of a motorcycle. Unlike the Devlin et al. invention, the present invention does not use an upper and lower windshield panel, and does not require an existing handle bar or console for attachment thereto. In addition, unlike the present invention, the Devlin et al. invention may not be stowed in the same location in which it operates.

U.S. Pat. No. 5,505,156 to Briggs discloses a windshield for boats which has two panels and which is secured to the boat floor when installed and in use. Unlike the Briggs invention, the present invention may be safely and conveniently stowed in the same location without creating an obstruction and protects the windshield from exposure and other damage when installed and stowed. In addition, the present invention may be quickly and easily operated and stowed and does not require a pre-installed console on the boat for operation.

U.S. Pat. No. 5,947,052 to Deising discloses an auxiliary windshield that is secured by a clamping means to a pre-existing structure such as an existing windshield. Unlike the Deising invention, the present invention may be safely and conveniently stowed in the same position without creating an obstruction and protects the windshield from exposure and other damage when installed and stowed. In addition, unlike the present invention, the Deising invention does not provide a console which protects the windshield when not in use.

U.S. Pat. No. 4,957,056 to Martin discloses a retractable arrangement for fishing boat console components. The windscreen is mounted on a pre-existing console of a boat and is operated by an extensible and retractable power actuator. The present invention does not require a pre-existing console to install or operate the windshield. Also, unlike the Martin invention, the entire windshield and console apparatus may be stowed in a position that is relatively or substantially flat or parallel to a floor or other surface within a compartment and does not cause an obstruction when not in use.

Thus, there is a need for a device that affords windshield and console protection to occupants of a vehicle in a manner which allows the device to be quickly and easily operated and stowed in the same location without creating an obstruction. There is also a need for the windshield in such an apparatus to be protected from exposure and other damage when stowed.

OBJECTS OF THE INVENTION

An object of the invention is to provide protection for vehicle occupants from conditions due to weather or operation of speed during travel, such as wind or water spray.

Another object of the invention is to provide a windshield and console that may be conveniently and quickly employed when needed and safely and conveniently stowed away in the same location when not needed.

Yet another object of the invention is to use and stow a windshield and console apparatus in a manner that does not obstruct the movement of vehicle occupants.

Still another object of the invention is to provide a retractable windshield and collapsible console to protect the windshield from exposure and other damage when not in use.

Another object of the invention is to provide a retractable windshield and collapsible console that is selectively portable.

Another object of the invention is to provide a retractable windshield and collapsible console that may be utilized by persons to provide protection from wind and/or exposure to environmental or weather conditions.

Another object of the invention is to provide a retractable windshield and collapsible console that may be used with or retrofitted on existing vehicles.

Another object of the invention is to provide a retractable windshield and collapsible console that may be installed in vehicles during the manufacturing process.

Numerous other objects, features and advantages of the present invention will become readily apparent through the detailed description of the preferred embodiment, drawings and claims.

SUMMARY OF THE INVENTION

A retractable windshield and collapsible console apparatus can be used for protection from wind, weather and/or environmental conditions, particularly on vehicles to provide windshield and console protection for vehicle occupants. Preferably, the apparatus is used with a boat.

The apparatus comprises a retractable windshield device, a windshield housing console, and a console base. When windshield protection is needed, the device is deployed from a stowed position, which is on top of and relatively or substantially flat, horizontal or parallel to the floor or deck of a vehicle or other surface by telescopically raising the windshield housing console from the console base. The windshield is then raised from a retracted position within the windshield housing console. When not needed or not in use, the device may be stowed by retracting the windshield into the windshield housing console and returning the windshield housing console to its original position and location on the floor or deck of the vehicle or other surface. The present invention may or may not be secured to a surface, may be used alone or with a vehicle, may be installed on a surface or in a compartment of a vehicle and may be retrofitted for pre-existing vehicles or into vehicles during the manufacturing process.

The present invention may be quickly and easily installed, operated, used, collapsed and stowed. The windshield and console apparatus allows greater freedom of movement about the vehicle when not in use. The present invention also allows greater freedom of movement when installed and in use because it does not surround occupants, allowing occupants to move around the apparatus positioned in front of them. The present invention may be conveniently and safely stowed in the same location in which it is used. Occupants may move freely about the vehicle because the present invention does not create an obstruction when not in use and stowed. In addition, the apparatus becomes a housing for the windshield when not in use, protecting the windshield from exposure and other damage.

DESCRIPTION OF THE DRAWINGS

A referred embodiment and alternate embodiments of the present invention are described herein with reference to the drawings wherein:

FIG. 25 is a side view of the windshield and console of the alternate embodiment of FIG. 21 in a stowed position; and FIG. 26 is a partial section view of the alternate embodiment of FIG. 22, take along section line 26—26 of FIG. 25.

DETAILED DESCRIPTION

Figure 1:
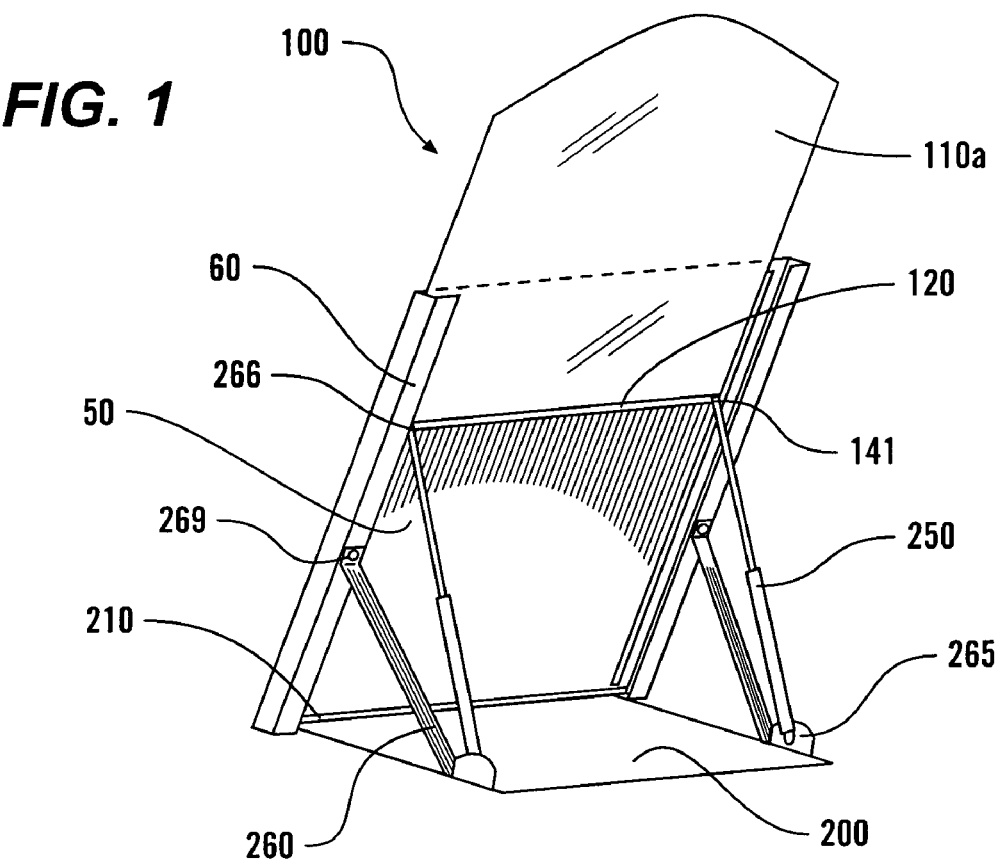
FIG. 1 is a perspective view of one embodiment of the retractable windshield and collapsible console in an upright deployed position.

While the invention is susceptible of various modifications and alternative constructions, certain illustrated embodiments shown in the drawings will be described below in detail. It should be understood, however, that there is no intention to limit the invention to the specific forms disclosed, but on the contrary, the invention is to cover all modifications, alternative constructions and equivalents falling within the spirit and scope of the invention.

In general, and as described below, the present invention may be used with pre-existing vehicles with or without securing the apparatus to the vehicle, retrofitted into pre-existing boats or may be installed into vehicles during the manufacturing process. The apparatus may be placed on or secured to a floor or other surface, within a floor or other surface, within a compartment of a vehicle anywhere an occupant may require windshield and/or console protection, or elsewhere in a vehicle. The apparatus may be used and stowed in the same location on, in or above a vehicle floor or other surface. When stowed, the present invention is substantially flat or parallel with the floor, other surface or console base of the apparatus and causes little or no obstruction to vehicle occupants. The apparatus may also be portable and used alone, apart from a vehicle, to protect a user from windspray or other environmental conditions. In the stowed position, the portable embodiment of the apparatus may also be used as a footrest, tabletop or other useful flat surface.

Referring to FIG. 1, a perspective view of a preferred embodiment of the present invention 10 in a deployed position is shown. The invention 10 comprises a windshield housing console 50, a console base 200, a retractable windshield device 100, and a supporting device 250, which also acts as a deployment device.

The windshield housing console 50 is pivotally connected to the console base 200 via a console securing device 210. The console securing device 210 is illustrated representatively as a piano hinge suitably secured to the console base 200 and to the windshield housing console 50. As illustrated in FIG. 1, the retractable windshield device 100 rests in a raised or deployed position within the windshield housing console 50. The retractable windshield device 100 comprises a windshield 110, a windshield frame 120, and a retractable windshield guide device 141. The windshield 110 may be made of any suitable material, and is preferably made of a durable, clear material, such as Lexan®.

The windshield housing console 50 preferably further comprises a windshield housing console frame 60. The windshield housing console 50 and windshield housing console frame 60 are preferably and illustrated representatively as a single piece of suitably material, preferably aluminum, formed to accommodate the retractable windshield device 100. The windshield housing console frame 60 comprises a single piece of material, preferably aluminum metal, with two ninety degree bends on each side, to accommodate the retractable windshield device, and one ninety degree bend on the bottom of the console to accommodate the console base securing device. The side and bottom bends or frame members of the console frame 60 may be formed into a channel to accommodate the retractable windshield device 100.

The windshield housing console 50 is made of a durable material which can withstand being walked upon and is resistant to damage. The windshield housing console 50 may be made of any material, such as aluminum, or any other suitable material. Alternatively, the windshield housing console 50 may be made of a sturdy clear material, suitably connected to the retractable windshield device 100. Where the windshield housing console 50 is made of a clear material, the windshield housing console 50 may or may not be used with an accompanying retractable windshield. Although the windshield housing console 50 and console frame 60 is illustrated representatively as a single formed piece preferably made from metal, such as aluminum, the windshield housing console and windshield housing console frame 60 may be of any suitable shape, form, design or material. The console may also be covered with a material such as fabric, for example carpet fabric.

The deployment and supporting device 250 is illustrated representatively as a pair of hydraulic cylinders, each suitably secured to the console base 200 via a deployment base securing device 265, illustrated representatively as a mounting bracket and screw assembly, and to the windshield frame 120 via a windshield frame securing device 266. Alternatively, the supporting device 250 may be one hydraulic cylinder suitably connected to the windshield housing console 50, or may be any supporting device, as required by the user.

Preferably, the supporting and deployment device 250 further comprise a retaining device 260. The retaining device 260 is illustrated representatively a strap or pair of straps, preferably made of nylon, connecting the console base 200 to the windshield housing console 50. The retaining device 260 is secured to the console base via a lower retaining securing device, illustrated representatively as connecting the lower end of the retaining device under the console base securing device 265. The retaining device 260 is secured at its upper end to the windshield housing console 50 via an upper retaining securing device 269, such as a rivet.

As part of windshield device 100, the windshield guide device 141 is connected to the windshield 110 and allows the windshield 110 and windshield frame 120 to slide upward or downward along a channel or guide 142 (not shown), within the windshield housing console frame 60, as described in more detail below with respect to FIGS. 10–13.

The present invention is deployed by raising or pivoting the windshield housing console 50 from its stowed position substantially flat with the console base 200, floor or other surface, to a substantially vertical position as illustrated. The present invention may also be raised to any angled position, as desired by the user or manufacturer. The windshield device 100 is raised by, for example, pulling upward on the upper edge of the windshield 110 which is attached to guide device 141 which slides upward along guide channel 142 which is secured to item 60 of device 50. The upward travel of device 100 actuates the deployment and supporting device 250. The deployment and supporting device 250 deploys the windshield device 100 after it is pulled upward from a retracted position and supports the windshield 110 and console 50 in the deployed position. The retaining device 260 prevents the deployment and supporting device 250 from extending the console 50 forward past a substantially vertical position or any desired position. The windshield 110 and console 50 are stowed by retracting the windshield 110 into its position within the windshield housing console 50, for example, by pushing the windshield 110, guide device 141 and supporting device 250 downward to a retracted position and releasing the console 50 downward into a resting position on the console base 200 or floor or other surface.

The apparatus 10 may or may not be secured to a vehicle. Where the apparatus 10 is installed on and secured to a floor or other surface, the console base 200 may be of any material required by the manufacturer or user. The console 50 may also be directly secured to a floor or other surface of a vehicle, including, for example, a console base 200 in the form of a floor or other surface of a vehicle, thereby eliminating the need for a separate console base 200.

Figure 2:
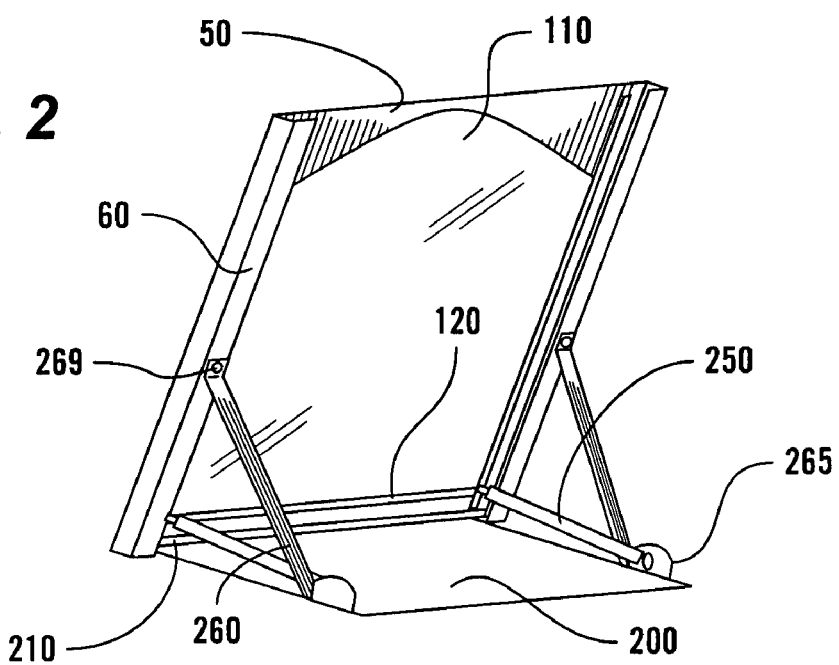
FIG. 2 is a perspective view of the retractable windshield and collapsible console in transition between deployed and stowed positions in which the windshield has been pushed down or retracted into a windshield housing console.

Referring to FIG. 2, a perspective view of the invention 10 in transition between a deployed and stowed position is shown. The windshield 110 has been retracted into the windshield housing console 50, and the console 50 is ready to be released or folded downward toward the console base 200. When the retracted windshield device 100 and console 50 are pushed down towards the console base 200 the retaining device 260 and supporting and deployment device 250 are disengaged.

Figure 3:
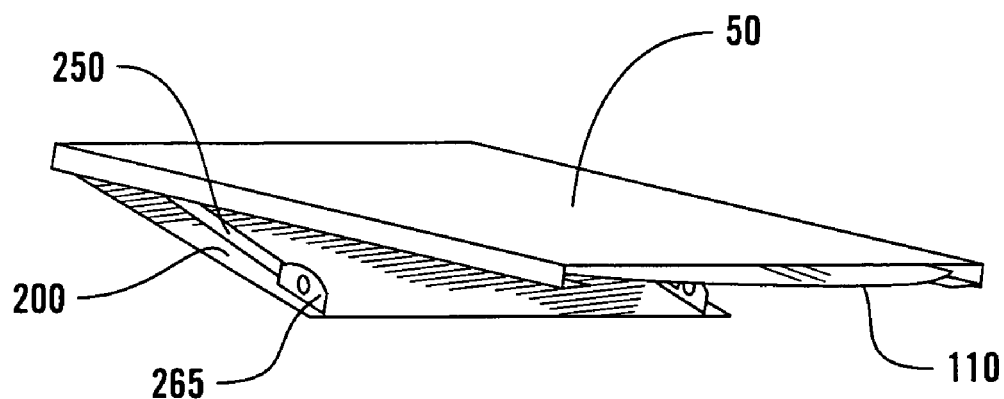
FIG. 3 is a perspective view of the retractable windshield and collapsible console in transition between deployed and stowed positions in which the windshield housing console has been pushed down towards the console base.

Referring to FIG. 3, a perspective view of the invention 10 is shown in transition between a deployed and stowed position. The windshield housing console 50 has been released down towards the console base 200.

Figure 4:
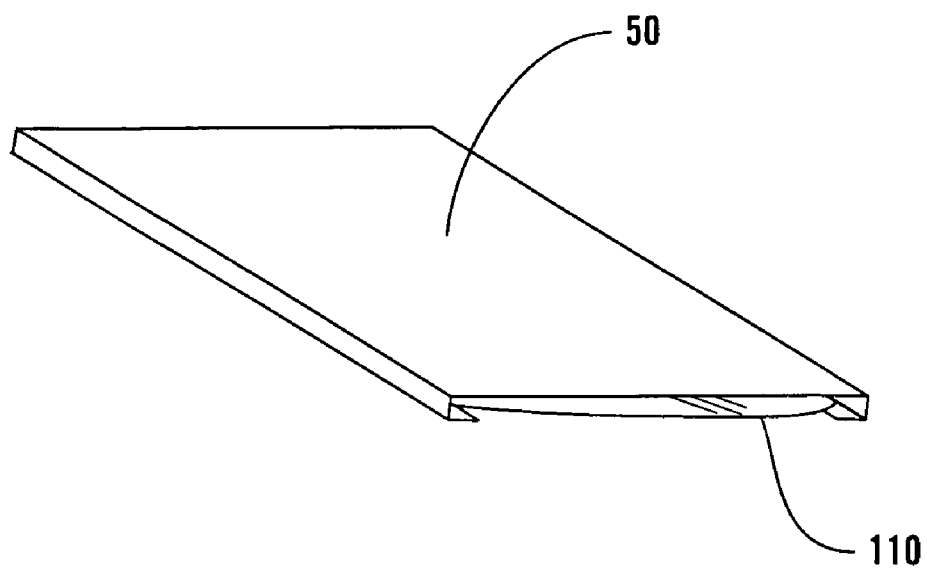
FIG. 4 is a perspective view of the retractable windshield and collapsible console in a stowed position.

Referring to FIG. 4, a perspective view of the invention 10 in a stowed position is shown. The windshield housing console 50 has been released down to a position which is substantially flat or parallel with the console base 200 or floor of a vehicle or other surface.

Figure 5:
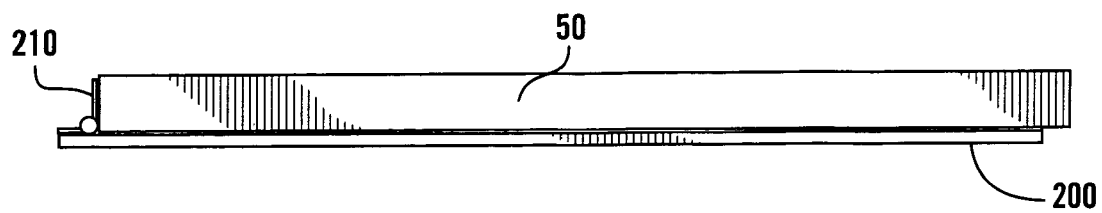
FIG. 5 is a side elevation view of the retractable windshield and collapsible console in a retracted, collapsed and stowed position.

Referring to FIG. 5, a side elevation view of the present invention 10 in a stowed position is shown. The windshield housing console 50 is substantially flat or parallel with the console base 200 or floor of a vehicle or other surface. The console base securing device 210, illustrated representatively as a hinge, is also shown.

Figure 6:
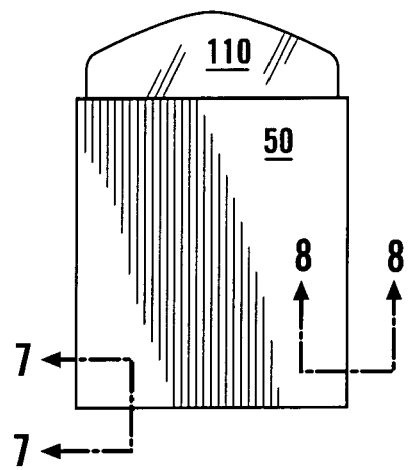
FIG. 6 is a front elevation view of the retractable windshield and collapsible console in a deployed, upright position.

Referring to FIG. 6, a front elevation view of the present invention 10 is shown illustrating the windshield housing console 50 and retractable windshield 110, and identifying sections 7—7 and 8—8.

Figure 7:
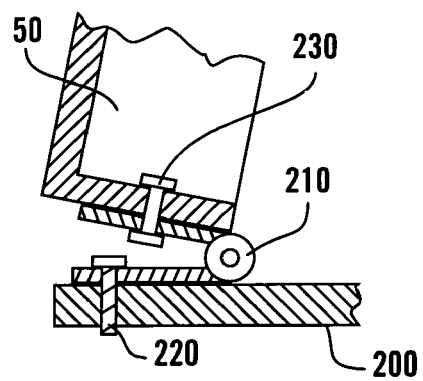
FIG. 7 is a section view of the hinge and connection between the windshield housing console and a base of the retractable windshield and collapsible console, taken along section line 7—7 of FIG. 6.

FIG. 7 is a section view of section 7—7 of FIG. 6 wherein the windshield housing console 50 is pivotally connected to the console base 200 by a console securing device 210, illustrated representatively as a piano hinge secured to the console base 200 with any suitable fastener 220, such as a screw, and to the windshield housing console 50 with any suitable fastener 230, such as a rivet. Although illustrated representatively as a piano hinge, screw and rivet assembly, the console securing device 210 may take any shape, design, form or material, as is known in the art, and may vary according to the preference of the user or manufacturer.

Figure 8:
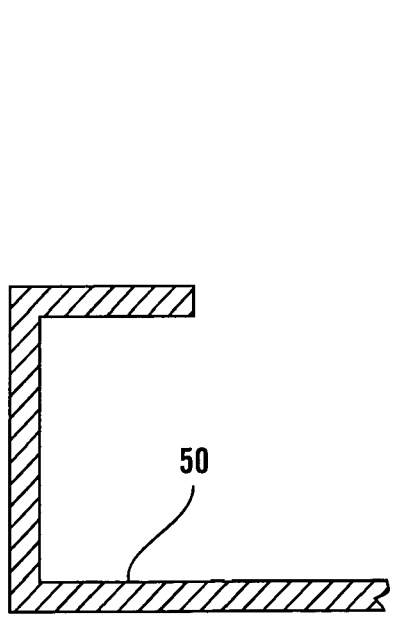
FIG. 8 is a section view of the windshield housing console of the retractable windshield and collapsible console, taken along section line 8—8 of FIG. 6.

Referring to FIG. 8, a section view of section 8—8 of FIG. 6 is shown, wherein the windshield housing console 50 is illustrated representatively as a single piece of material, which is bent at approximately ninety degree angles twice on each side, as shown, forming a frame for the retractable windshield device 100. The windshield housing console 50 may be made of metal, such as aluminum, or any other suitable material. The windshield housing console 50 accommodates the retractable windshield device 100 to protect the retractable windshield device 100 from damage from above and/or the sides. The windshield housing console 50 also protects the retractable windshield device from damage due to contact with the floor or deck by holding the retractable windshield device 100 up off the 20 floor or deck.

Figure 9:
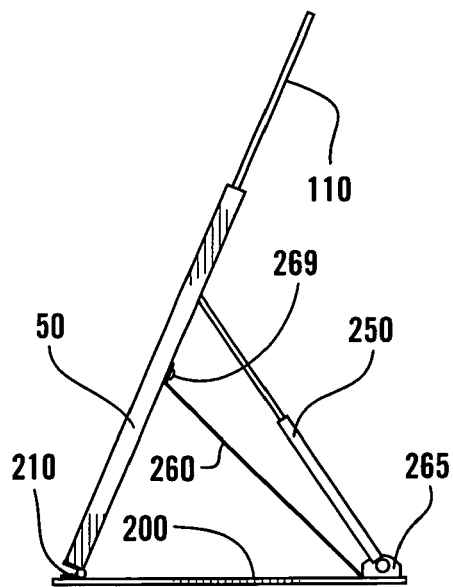
FIG. 9 is a side elevation view of the retractable windshield and collapsible console in a deployed, upright position.

Referring to FIG. 9, the present invention 10 is shown from a side elevation view. The supporting and deployment device 250 is connected at one end to the windshield frame 120 (not shown) via a windshield frame securing device 266 and at the other end to the console base 200 via a deployment base securing device 265 (see FIG. 1), illustrated representatively as a bracket and screw assembly. The retaining device 260, represented illustratively as a pair of nylon straps 260, one on each side of the windshield housing console 50, is connected to the console base 200 at one end via a lower retaining securing device, illustrated representatively as the deployment base securing device 265, and at the other end to the windshield housing console 50 via an upper retaining securing device 269, illustrated representatively as a rivet.

Figure 10:
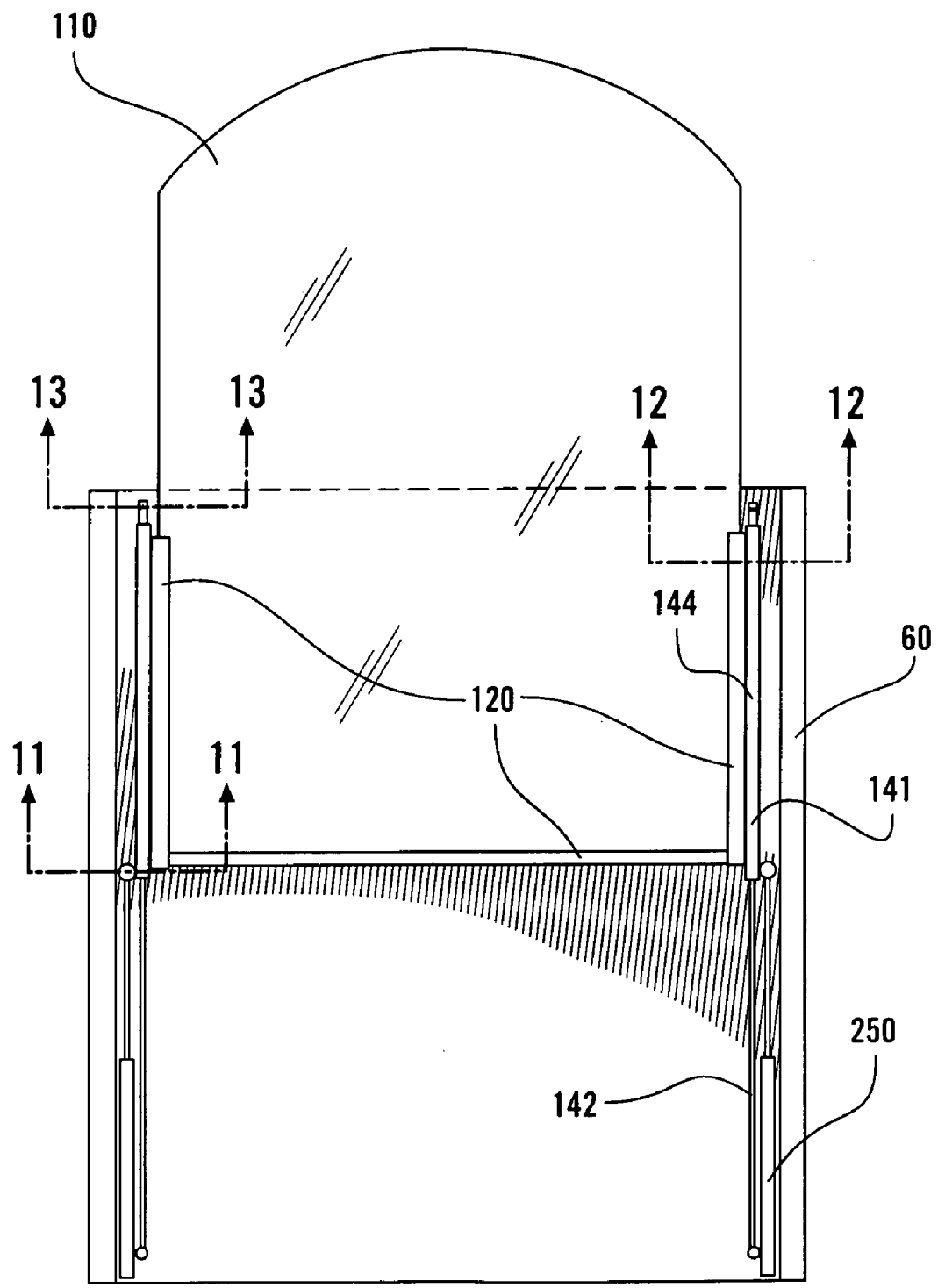
FIG. 10 is a rear elevation view of the retractable windshield and collapsible console in a deployed, upright position.

Referring to FIG. 10, a rear elevation view of the preferred embodiment of the present invention 10 is shown, illustrating the windshield housing console and retractable windshield device in an upright, deployed position, and identifying sections 11—11, 12—12 and 13—13. The retractable windshield device 100 comprises a windshield 110 and a windshield frame 120. The windshield frame 120 is represented illustratively as a channel surrounding the windshield on the bottom and side edges. The windshield 110 is inserted into the channel formed by windshield frame 120 and is suitably secured to the windshield frame 120, for example, by two screws on each side. The retractable windshield device 100 further comprises a windshield guide device 141. The retractable windshield guide device 141 is illustrated representatively as comprising an outer tube wall 144, a guide channel 142, upper and lower spacers 145 and 147 a stud 148 and lower fastener 146 (See FIG. 11). The connection between the windshield frame and the outer tube fall may be accomplished by welding or other known methods. The outer tube wall 144 may be formed from aluminum, other metal or other suitable material.

Figure 11:
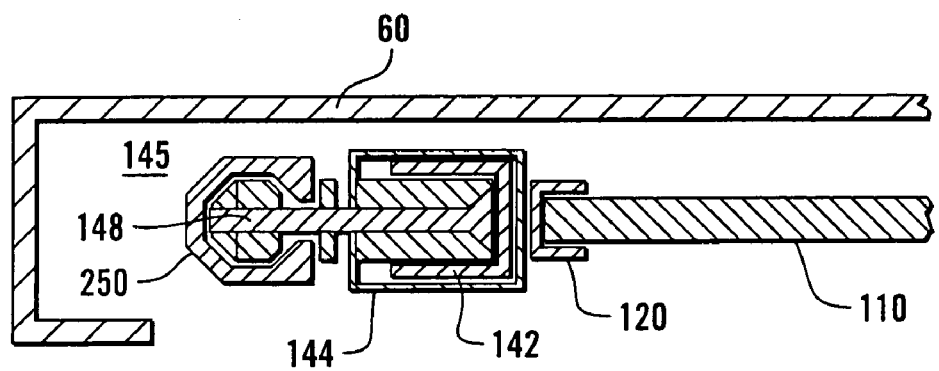
FIG. 11 is a cross-sectional view of the lower connection between the hydraulic lift device and the windshield and windshield housing console of the retractable windshield and collapsible console, taken along section line 11—11 of FIG. 10.

FIG. 11 is a section view of Section 11—11, of FIG. 10, taken at the connection point of the supporting and deployment device 250 and the retractable windshield device 100, illustrating the connections, fit and interaction of the windshield housing console 50, the retractable windshield device 100, the retractable windshield guide device 141, and the supporting and deployment device 250. The supporting and deployment device 250 is attached to stud 148. Stud 148 is also the fastener for the lower channel guide 145 of the retractable windshield guide device 141. The inner channel 142 acts as a guide rail for the movement of outer tube wall 144, which surrounds the inner channel 142. The windshield inner channel 142 may be formed of steel, other metal or other suitable material. The inner channel 142 is connected to the console frame 60, preferably through a hole near the top and bottom of the inner channel 142 and through the console frame 60 via a securing device, such as a flat head rivet 82 and spacer 84 (see FIG. 13). The arrangement of the inner channel 142 and console frame 60 is designed such that inner channel 142 is held out from console frame 60 by spacer 84 (see FIG. 13) such that sufficient room is available for the outer tube 144 to slide up and down inner channel 142 when the windshield is being deployed or retracted by the action of the deployment device 250 on windshield frame 120. Upper and lower rail guide devices, described below, are used to facilitate this movement.

As illustrated in FIG. 11, the windshield guide device 141 further comprises a lower rail guide device 140 used to guide the windshield 110 as it slides upward or downward along the inner channel 142. The lower rail guide device 140 comprises a spacer 145, preferably a neoprene spacer, that moves within the inner channel 142, and which is fitted to accept a securing device 148, illustrated representatively as a stud or tapered head bolt 149, a nut 150 and a locking nut 151. The securing device 148 connects spacer 145, outer tube 144, and the deployment and supporting device 250. The hydraulic cylinder 250 is illustrated representatively as having a common fitting at one end which slides over locking nut 151 and stud 148 and locks into position as shown in FIG. 11. It should be understood that both hydraulic cylinders are attached in this manner.

Figure 12:
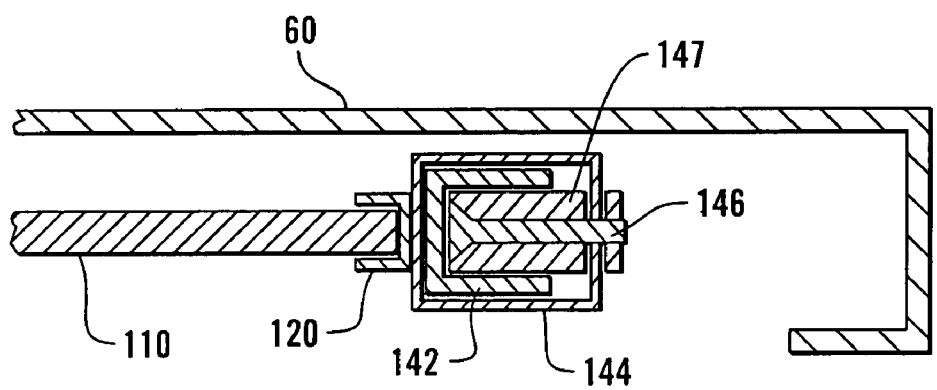
FIG. 12 is a cross-sectional view of the upper connection of the retractable windshield guide device between the windshield and windshield housing console of the retractable windshield and collapsible console, taken along section line 12—12 of FIG. 10.

FIG. 12 is a section view of section 12—12 of FIG. 10, illustrating the interaction and fit of the windshield housing console 50, the retractable windshield device 100, and the retractable windshield guide, device 141 at the location of the upper portion of the windshield device 141. The upper guide device 130 is represented illustratively as a spacer 147 and a securing device 146, represented illustratively as a screw and nut. The upper spacer 147 moves or rides inside the inner channel 142, and is connected to outer tube 144 via securing device 146. The spacers 145, 147 may be replaced as needed due to wear. Although the spacers 145 and 147 are preferably neoprene spacers, the spacers may be of any suitable design, shape or material.

Figure 13:
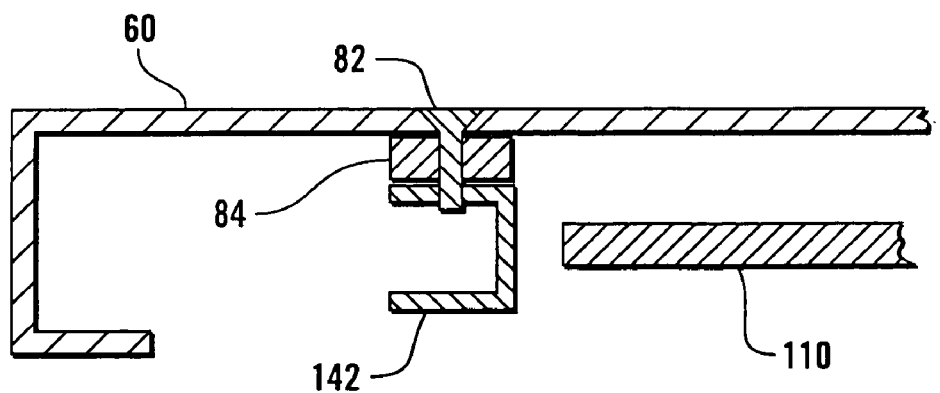
FIG. 13 is a cross-sectional view of the inner guide channel of the retractable windshield guide device, taken along section line 13—13 of FIG. 10.

FIG. 13 is a section view of section 13—13 of FIG. 10 illustrating a windshield stopping device 80, comprising the spacer 84 and rivet 82 as well as the connection of guide channel 142 to the windshield housing console frame 60. The inner channel 142 is connected to the windshield housing console frame 60 at each upper and lower end via a securing device 125, illustrated representatively as a spacer 84 and a rivet 82. As the windshield is raised, the outer tube 144 (not shown) slides upward on inner channel 142 until outer tube 144 comes into contact with upper spacer 84, halting the upward movement. The windshield 110 is retracted by sliding or lowering outer tube 144, and consequently windshield frame 120 and windshield 110, to a lower spacer (not shown), at the bottom end connection of the inner channel 142 and console frame 60. The height of the windshield may be made adjustable, for example by providing an adjustable stop set screw to inner channel 142 to stop the upward or downward motion of the windshield frame 120 at a desired position.

Figure 14:
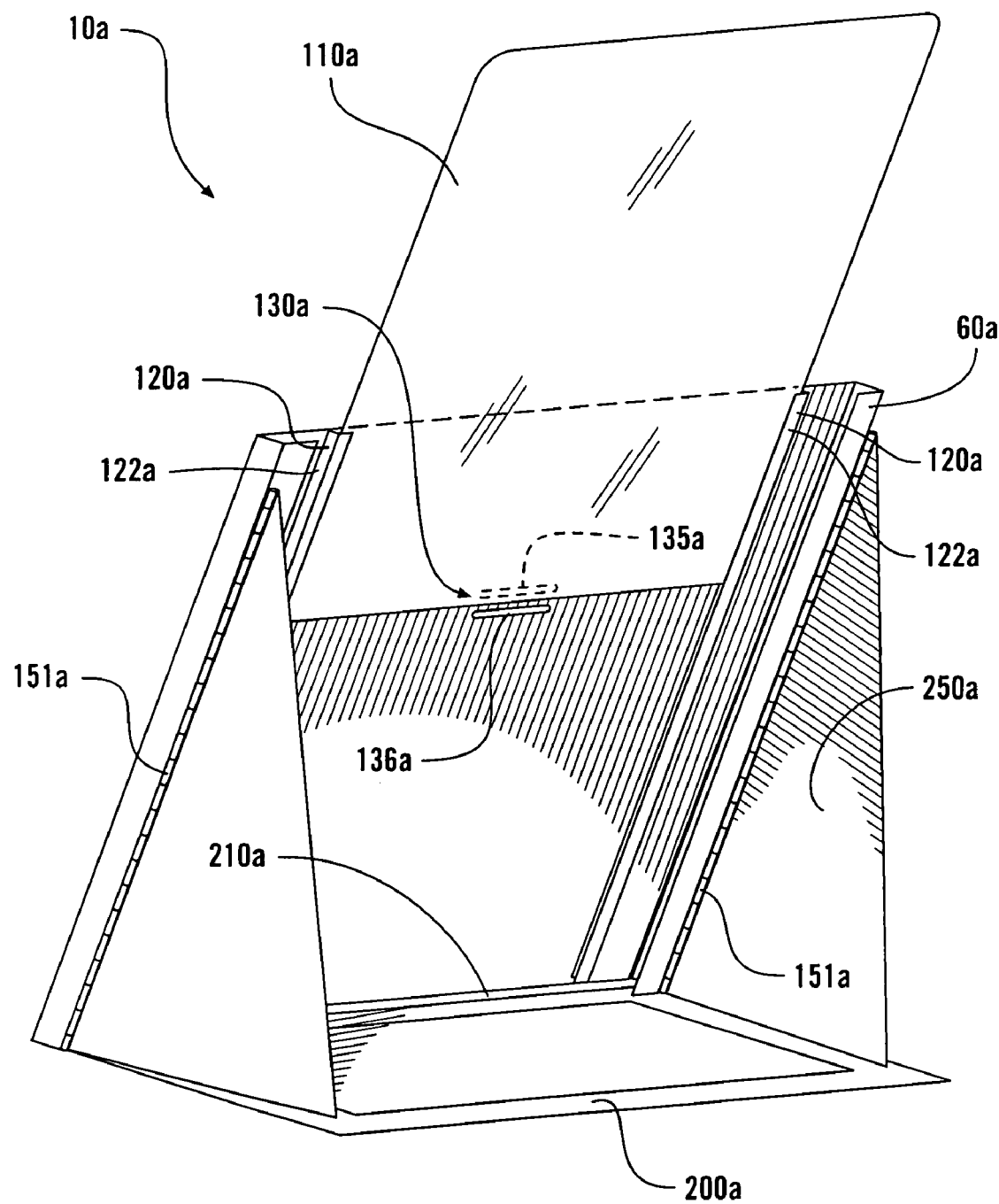
FIG. 14 is a perspective view of a first alternate embodiment of the retractable windshield and collapsible console in an upright deployed position.

Referring to FIG. 14, a perspective view of a first alternate embodiment of the present invention 10*a* is shown in which the retractable windshield and collapsible console may be placed on a vehicle floor or other surface. The alternate embodiment of the present invention 10*a* comprises a windshield housing console 50*a*, a retractable windshield device 100*a*, a supporting device 250*a*, and a console base 200*a*.

The first alternate embodiment is similar to the preferred embodiment shown in FIGS. 1–13, with the exception that the retractable windshield device 100*a*, windshield frame 120*a* and supporting device 250*a* differ, as described below.

The supporting device 250*a*, represented illustratively as a pair of legs or wings which fold inward to and outward from the console 50*a*, is adjustably connected to windshield housing console frame 60*a* via a console securing device 210*a*. Although the supporting device 250*a* is illustrated in FIG. 14 as comprising a pair of support legs, a single support leg suitably secured to the windshield housing console, or any suitable support device, may be used, as required by the user.

The retractable windshield 110*a* is shown in FIG. 14 in a raised or deployed position within the windshield housing console 50*a*. The retractable windshield device 100*a* comprises a windshield 110*a*, a windshield slide channel frame assembly 120*a* and a windshield locking device 130*a*. The windshield may be made of any suitable material, and is preferably made of a durable, clear material, such as Lexan®. The windshield is illustrated representatively as a single piece of windshield material which slides up and down inside of windshield side frame members 121*a* and 122*a*. The windshield locking device 130*a* is illustrated representatively as a windshield lock block 135*a* secured to the retractable windshield 110*a*, which engages a second lock block 136*a* suitably affixed to the windshield housing console 50*a*. Although illustrated representatively as a pair of lock blocks, with one of each suitably affixed to either the windshield or console, the windshield locking device may of any suitable design, shape or form. The windshield locking device may also be adjustable, for example through the use of lock blocks at varying positions.

Figure 16:
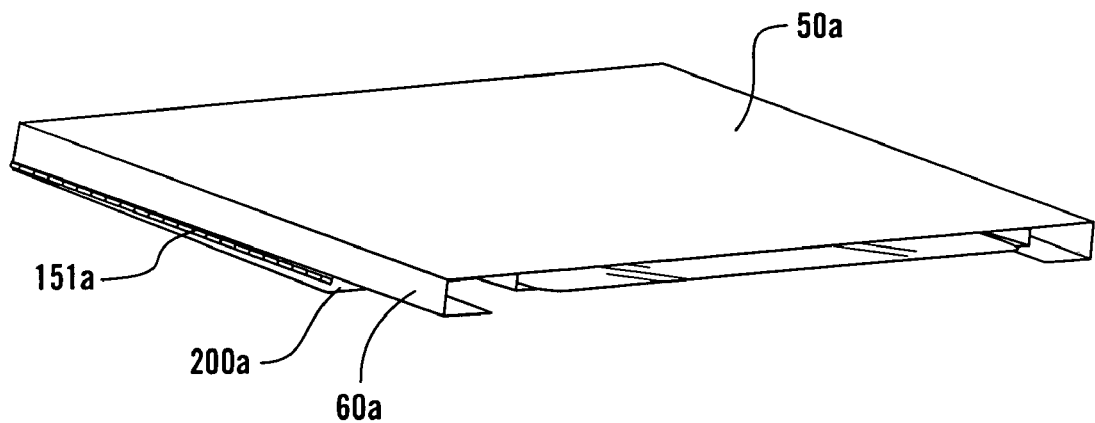
FIG. 16 is a perspective view of the alternate embodiment of FIG. 14 in a stowed position.

The first alternate embodiment of the present invention 10*a* may be deployed by raising the windshield housing console 50*a* from its stowed position relative to the console base 200*a* (see FIG. 16). Console 50*a* is pivoted up and away from base 200*a*. The supporting device 250*a* is employed, for example by folding the wings or legs outward from the windshield housing console 50*a* to a position at rest atop the console base 200*a*. The windshield 110*a* is raised and locked into position by engaging the windshield lock block 135*a* and the windshield housing console lock block 136*a*, which may be accomplished by pulling outward on the bottom edge of the windshield 110*a* until the windshield block 135*a* passes over and engages the console lock block 140*a*.

The first alternate embodiment of the invention 10*a* may be stowed by retracting the windshield 110*a* into a lowered position within the windshield housing console 50*a* by pulling outward on the lower portion of the windshield 110*a*, near the windshield locking block 135*a* to disengage the abutment of the lock blocks 135*a*, 136*a*, allowing the lock blocks 135*a*, 136*a* to pass over one another and retracting the windshield 110*a* into the windshield housing console 50*a*. The supporting device 250*a* is disengaged by folding in the legs 250*a*. The windshield housing console 50*a* may then be lowered downward to a location substantially flat or parallel with the console base 200*a*, a floor or other surface.

Similar to the preferred embodiment of FIGS. 1–13, the first alternate embodiment of the invention 10*a* may be positioned on or above a floor of a vehicle or other surface as desired by the user or manufacturer, and may or may not be secured to or installed on the vehicle. The preferred embodiment may be used and stowed in the same location. The first alternate embodiment may also be portable.

Figure 15:
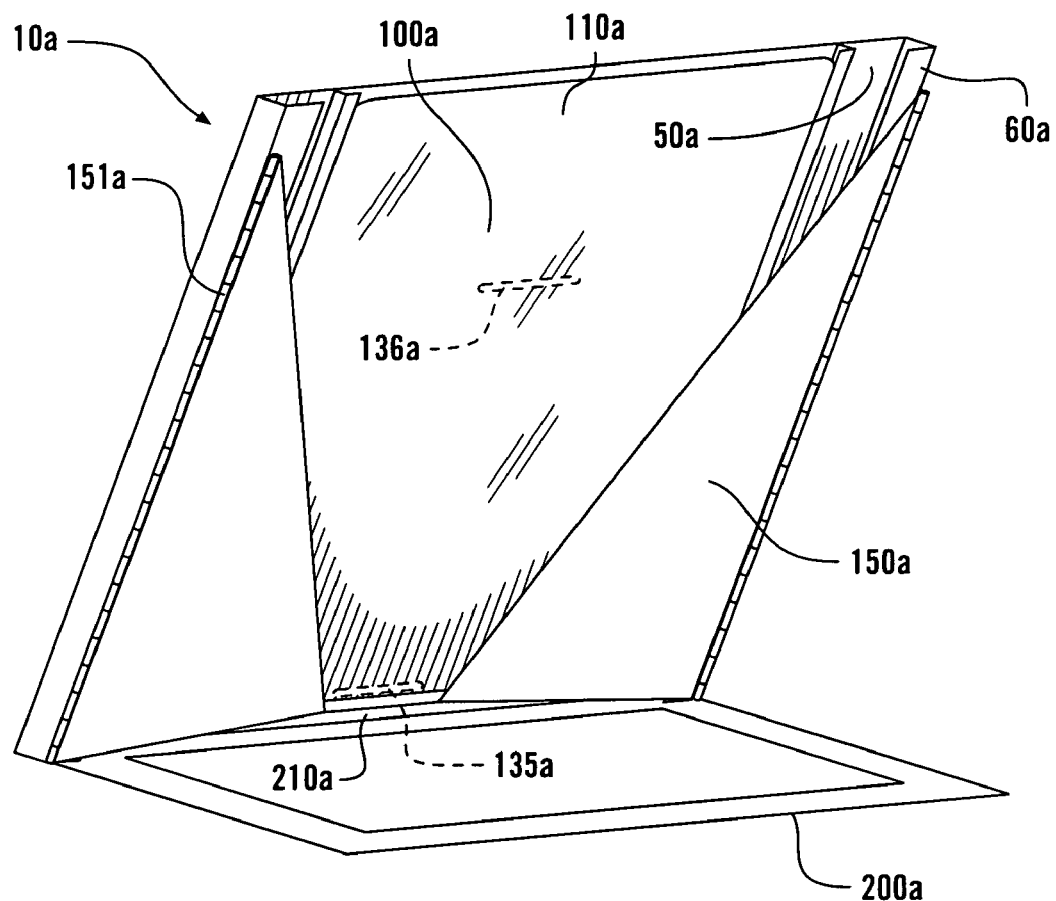
FIG. 15 is a perspective view of the alternate embodiment of FIG. 14 in transition between upright and stowed positions in which the windshield has been retracted into a windshield housing console, with the supporting wings folded inward to enable the apparatus to be lowered down to the floor.

Referring to FIG. 15, the alternate embodiment of FIG. 14 is shown in transition between a deployed and a stowed position. The windshield locking device 130*a* has been disengaged and windshield 110*a* has been retracted into the windshield housing console 50*a*. The supporting device 250*a* has been disengaged, represented illustratively as a pair of legs or wings, folded inward to a position which is substantially parallel or flat relative to the windshield housing console 50*a* via the supporting securing device 151*a*. The windshield housing console 50*a* can then be pushed or lowered down about pivot console securing device 210*a* toward the console base 200a to a stowed position which is substantially flat or parallel with a floor of the vehicle or other surface, as illustrated in FIG. 16.

Figure 17:
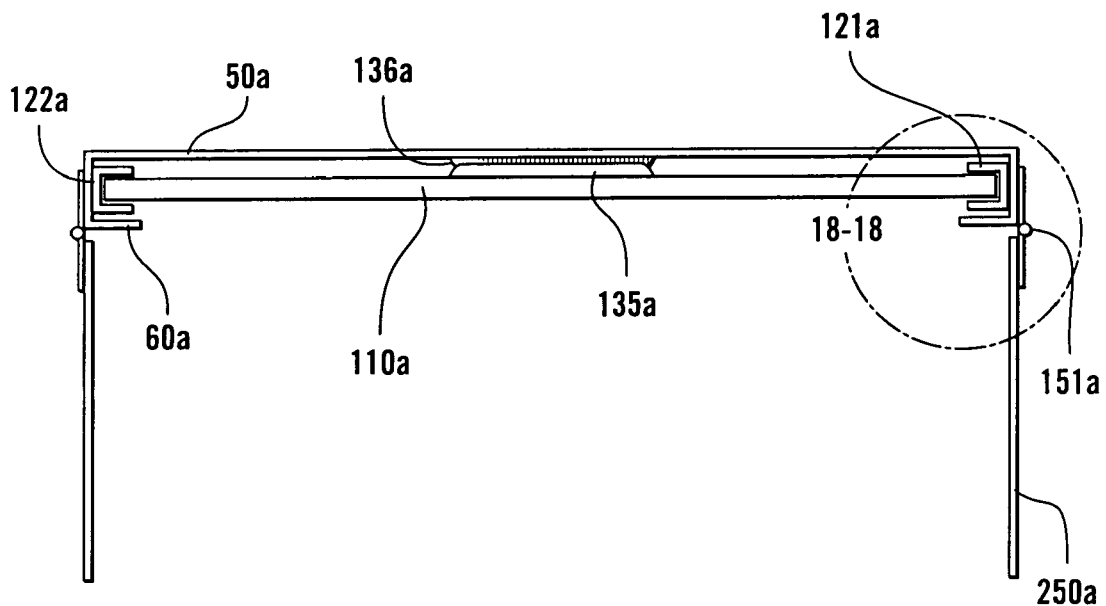
FIG. 17 is a top view of the alternate embodiment of FIG. 14.

Referring to FIG. 17, a top view of the alternate embodiment of FIG. 14 is shown. The windshield 110a, windshield frame 120a, windshield housing console 50a, supporting device 250a (folded outward from the windshield housing console 50a) and supporting securing device 151a are shown. The windshield frame 120a comprises two side members 121a, 122a, secured to the windshield housing console frame 60a, which retain the windshield 110a as it slides up and down from a retracted position to a deployed position and back. When the windshield 110a is raised, it slides inside each side frame member 121a, 122a until the windshield locking device (see FIG. 14) is engaged. The supporting device 250a is secured to the windshield housing console frame 60a via a supporting securing device 151a, illustrated representatively as a hinge.

Figure 18:
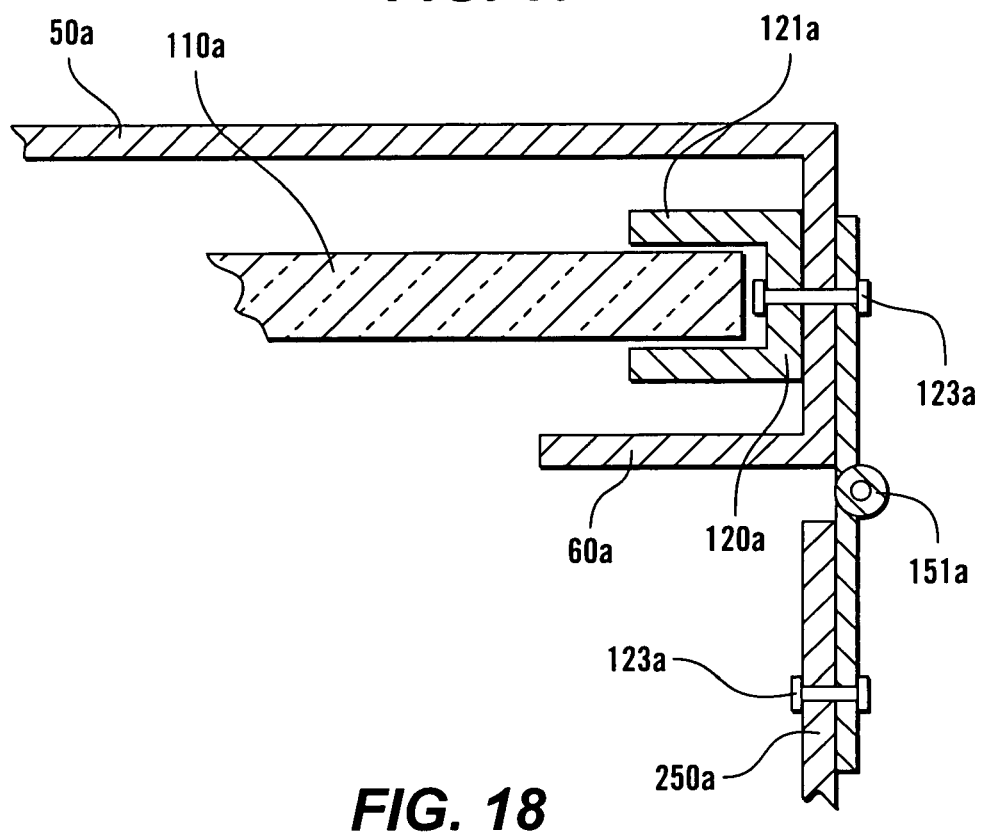
FIG. 18 is an enlarged view of Section 18—18 of FIG. 17, illustrating the connection of to the hinge to the windshield housing console and supporting device.

Referring to FIG. 18, an enlarged view of Section B—B of FIG. 17 is shown. The windshield frame members 121a, 122a of the windshield frame 120a are secured to the windshield housing console frame 60a via a windshield frame securing device 123a, represented illustratively as two pairs of flat head rivets on each side of the windshield housing console frame 60a. The supporting device 250a is secured to the windshield housing console frame 60a via a supporting securing device 151a, represented illustratively as a hinge connected to the windshield housing console frame 60a by two pairs of flat head rivets near the top and the bottom.

Figure 19:
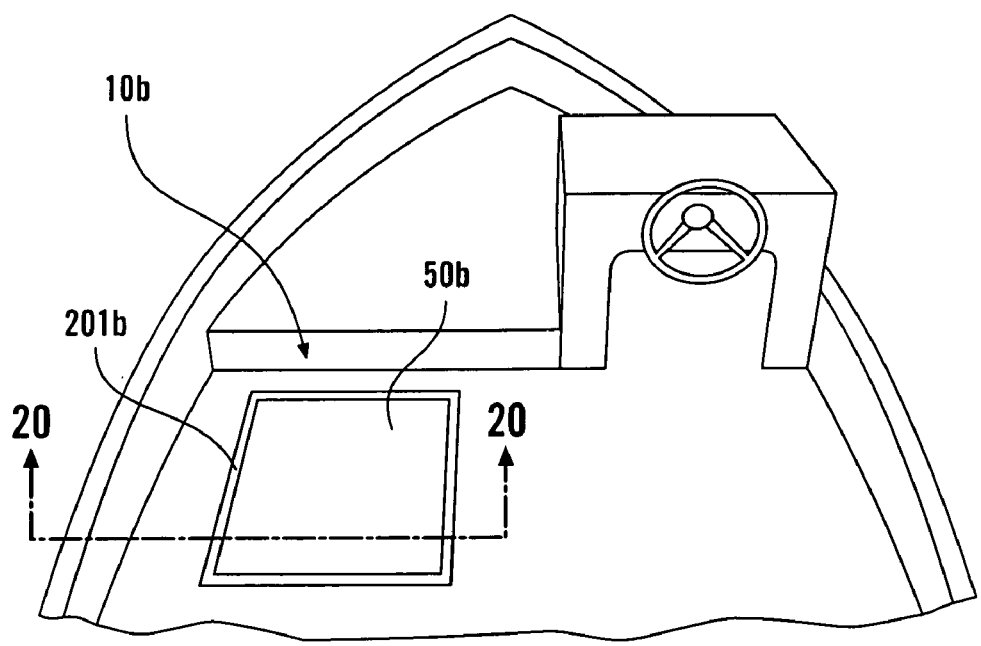
FIG. 19 is a perspective view of a second alternate embodiment of the retractable windshield and collapsible console in a stowed position within a vehicle floor or deck.

Referring to FIG. 19, a second alternate embodiment 10b of the present invention is shown in which the retractable windshield and collapsible console 50b is stowed in a console base compartment 204b compartment substantially within the same plane as the floor or deck of the vehicle or other surface. The second alternate embodiment 10b is similar to the preferred and first alternate embodiments, with the exceptions described below.

Figure 20:
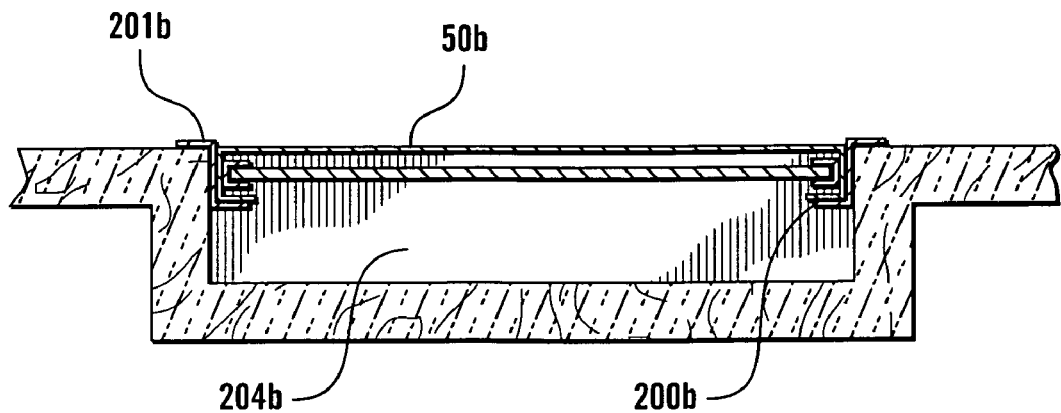
FIG. 20 is a cross sectional view of the alternate embodiment of FIG. 19, taken along section line 20—20 of FIG. 19.

Referring to FIG. 20, a section view of Section 20—20 of FIG. 19, the console base 200b comprises a console base compartment 204b windshield housing console retainer 201b positioned in the compartment 204b, illustrated representatively as a "z" shaped channel, preferably of aluminum metal, used to retain the windshield housing console in a stowed position. The housing console retainer 201b acts as a resting point and/or connection point for the supporting device 250b (not shown), such as the hydraulic lifts of FIG. 1 and the supporting wings of FIG. 14. Alternatively, the console base 200b may be, for example, a separate base placed on top of or secured to the floor compartment as described above or may be the floor of the compartment alone.

Figure 21:
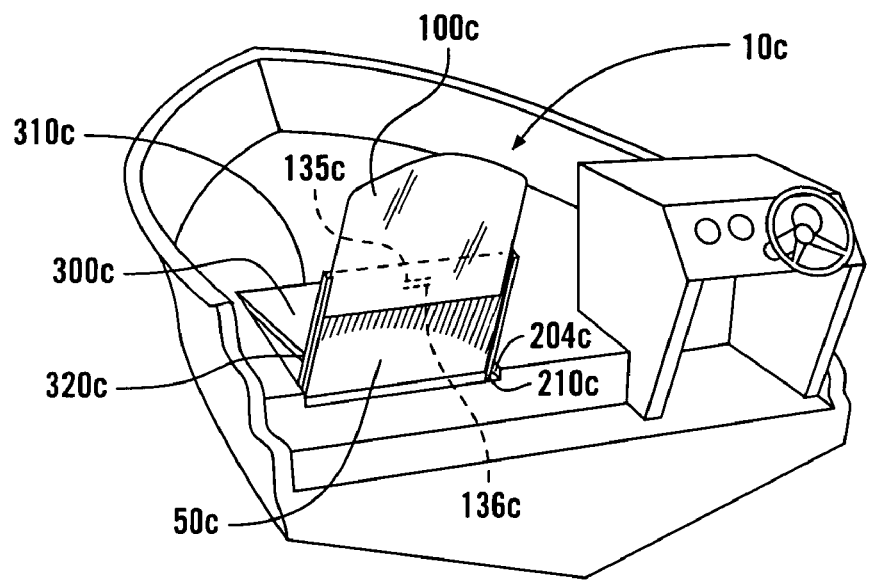
FIG. 21 is a perspective view of a third alternate embodiment of the retractable windshield and collapsible console installed into a vehicle floor or deck, shown in a deployed, upright position.

Referring to FIGS. 21 through 26 a third alternate embodiment of the present invention, 10c, is shown. Referring to FIG. 21, a perspective view of the third embodiment is shown with the windshield in the deployed upright position. The apparatus 10c may be installed into a compartment in a floor or raised floor or deck of a vehicle or other surface, and comprises a retractable windshield device 100c, a windshield housing console 50c, and a console base 200c. The retractable windshield device 100c and windshield housing console 50c are similar to those described in the first alternate embodiment of FIG. 14.

The console base 200c further comprises a console base securing device 210c, a console base compartment 204c, a console base compartment door 300c, and a console base compartment door securing device 310c. The windshield housing console 50c further comprises at least one support connection 320c. The console base securing device 210c comprises a connecting and pivot device 242c, connecting the windshield housing console 50c on each side to the console base compartment 204c (best seen in FIGS. 23–26). Alternatively, the console base securing device 210c may be similar to that described in the embodiments of FIGS. 1 and 14, illustrated representatively as a hinge. The compartment door 300c acts as a supporting device for the windshield housing console 50c when the apparatus is in the deployed position. The retractable windshield device 100c is similar to those described in the first alternate embodiment as shown in FIGS. 14–17 with the exception of the supporting device, as described below.

Figure 22:
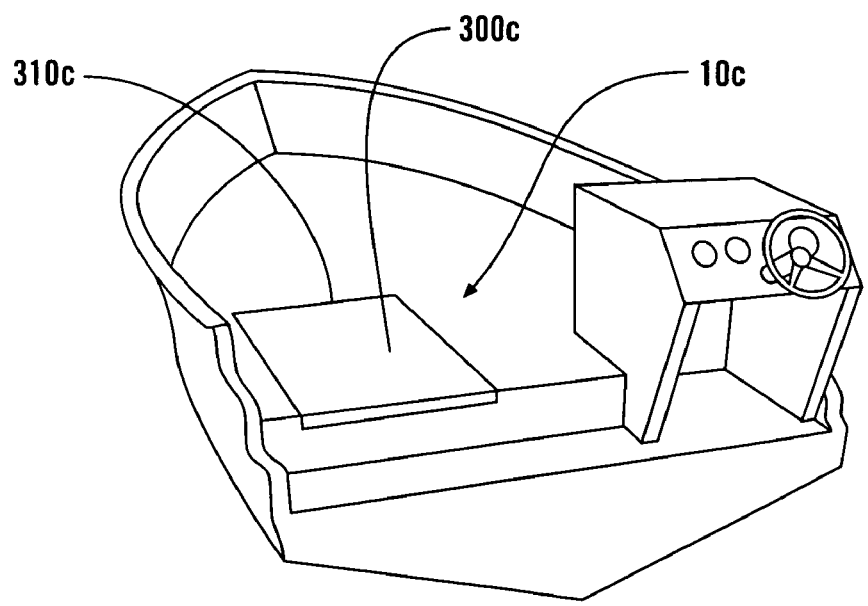
FIG. 22 is a perspective view of the third alternate embodiment of FIG. 21 in a stowed position.

The apparatus is deployed from a stowed position, as illustrated in FIG. 22, by raising the compartment door 300c via the console base compartment door securing device 310c, and then pivoting and raising the windshield housing console 50c and retractable windshield device 100c from within the console base compartment 204c via the console base securing device 210c. The compartment door 300c is then lowered down toward the console base 200c until it meets and rests upon the support connection 320c on the windshield housing console 50c.

Referring to FIG. 22, a perspective view of the embodiment 10c is shown in a stowed position, with the compartment door 300c closed.

Figure 23:
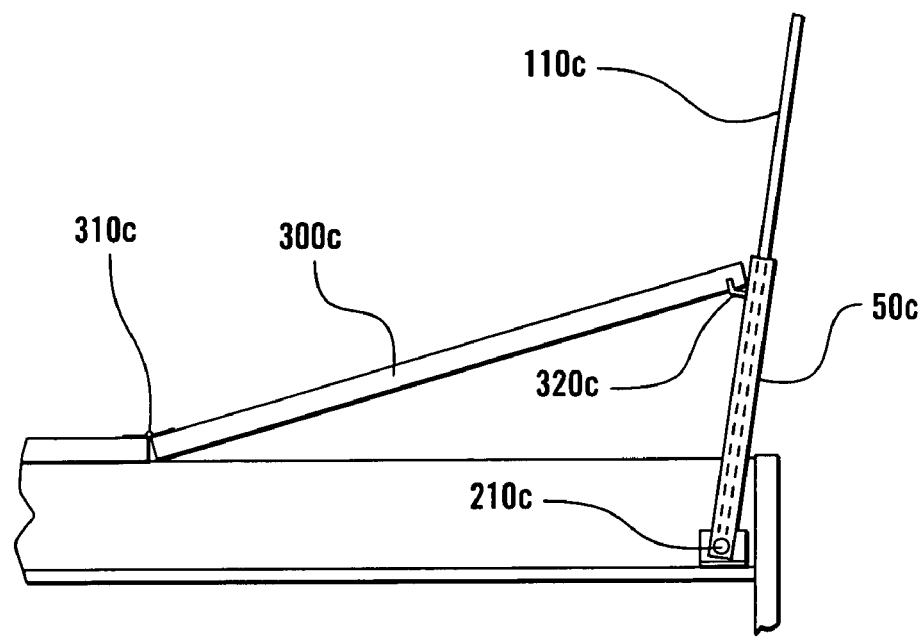
FIG. 23 is a broken away side view of the alternate embodiment of FIG. 22 in a deployed upright position.

Referring to FIG. 23, a side view of the embodiment of FIG. 22 is shown in a deployed position. The embodiment 10c is shown with windshield 110c extended from the console 50c, the console 50c raised from the console base compartment 204c and connected to and supported by the console compartment door 300c. The console compartment door 300c is also connected to the console base compartment 204c via a compartment door securing device 310c, illustrated representatively as a hinge. The support connection 320c is illustrated representatively as a hook, preferably a threaded rod, secured to the windshield housing console 50c. The support connection 320c engages a support connection device adapter 330c on the compartment door 300c, illustrated representatively as a hole into which the support connection device 320c fits. The console base securing device 210c is illustrated representatively as a pivot pin and bracket assembly on each side of the console connecting the console to the compartment 204c.

Figure 24:
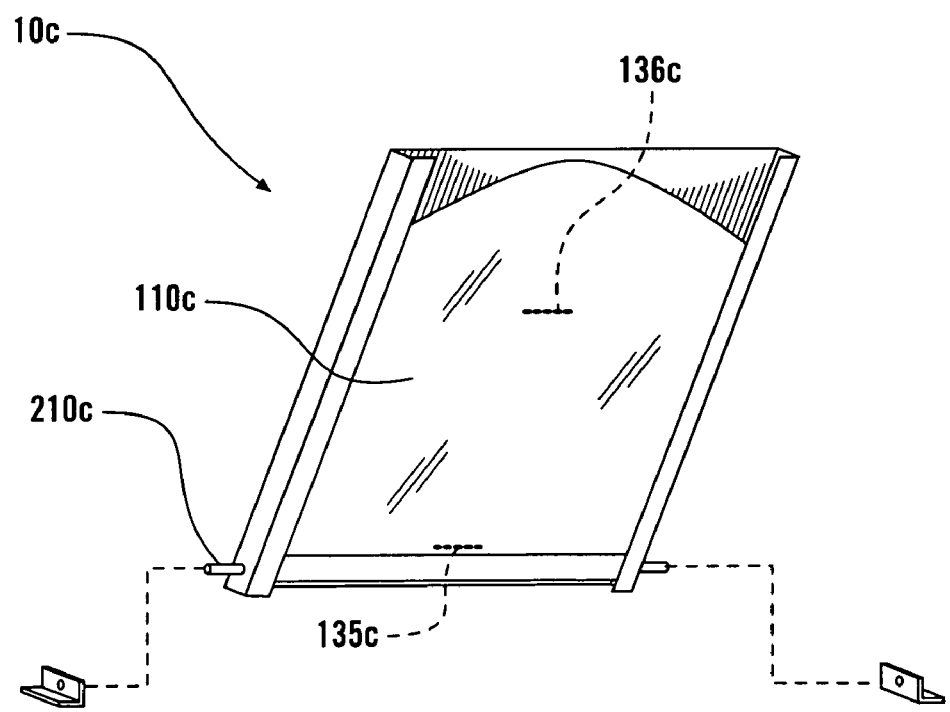
FIG. 24 is a perspective view of the windshield and console of the alternate embodiment of FIG. 22 in a semi stowed position

Referring to FIG. 24, a perspective view of the console base securing device 210c of the embodiment in FIG. 22 is shown. The console base securing device 210c is illustrated representatively as comprising a pivot pin and bracket assembly, with the pins secured to the console and fitting within the brackets attached to the console base compartment 204c.

Referring to FIG. 25, a side view of the retractable windshield device 100c in an extended position is shown and identifying Section 26—26. The windshield 110c is extended from the console 50c, and the connections between the support connection device 320c and the console 50c and between the console 50c and the pivot pin 210c are shown.

Referring to FIG. 26, a section view of Section 26—26 of FIG. 25 is shown, illustrating the console securing device pivot pin 210c and the support connection 320c. The console 50c is secured to the compartment via a securing device 210c, illustrated representatively as a pivot pin attached to each side of the console frame 60.

Figure 27:
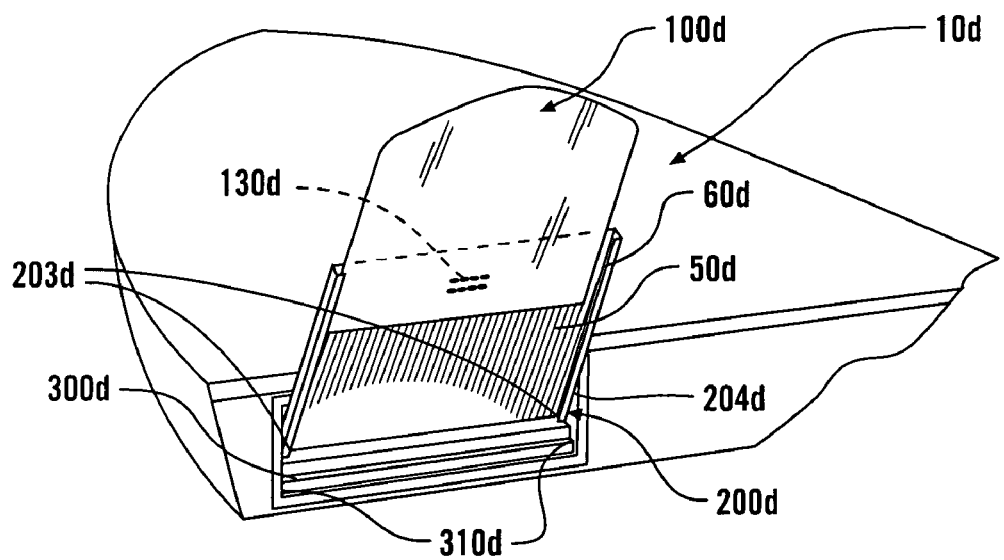
FIG. 27 is a perspective view of a fourth alternate embodiment of the retractable windshield and collapsible console in an upright deployed position.

Referring to FIG. 27, a fourth alternate embodiment 10d of the present invention is shown in a deployed position in which the present invention is installed into a compartment in a vehicle, such as a raised deck, or elsewhere. The embodiment 10d comprises a console base 200d, a windshield housing console 50d and a retractable windshield device 10d. The retractable windshield device 100d, windshield housing console 50d and console frame 60d are similar to those described in FIG. 14.

The console base 200d further comprises a console base compartment 204d, a console base track assembly 201d (best seen in FIGS. 31–34) secured to the compartment 204d, a compartment door 300d, a compartment door track assembly 202d (best seen in FIGS. 31–34), and a compartment door securing device 310d connecting the compartment door 300d to the compartment door track assembly 202d. The console frame 60d further comprises a console base track securing device 203d adjustably connecting the console frame 60d to the console base track assembly 201d. The console base track assembly 201d further comprises an upper track 208d and a lower track 209d (shown in FIGS. 31–34), which guide the console 50d as it is moved from deployed and stowed positions. The upper and lower tracks 208, 209d are suitably designed to retain and support the console 50d in deployed and stowed positions and to allow the console 50d to pivot in transition between deployed and stowed positions.

The apparatus 10d is deployed by opening the compartment door 300d, pivoting and pushing the compartment door 300d back via the compartment door track assembly 202d, pulling the console 50d forward via the console base track assembly 201d, and pivoting the console 50d upward until the console base track assembly 201d locks and supports the console 50d in a deployed position, and raising the windshield 110d into a raised position by engaging the windshield locking device 130d. The apparatus is stowed by disengaging the windshield locking device 130d, lowering the windshield 110d into a retracted position within the console 50d, pivoting the console 50d downward, and pushing the console 50d up and back along the console base track assembly 201d. The compartment door 300d is closed by pulling outward on the compartment door 300d and pivoting the compartment door 300d upwards into a closed position.

Figure 28:
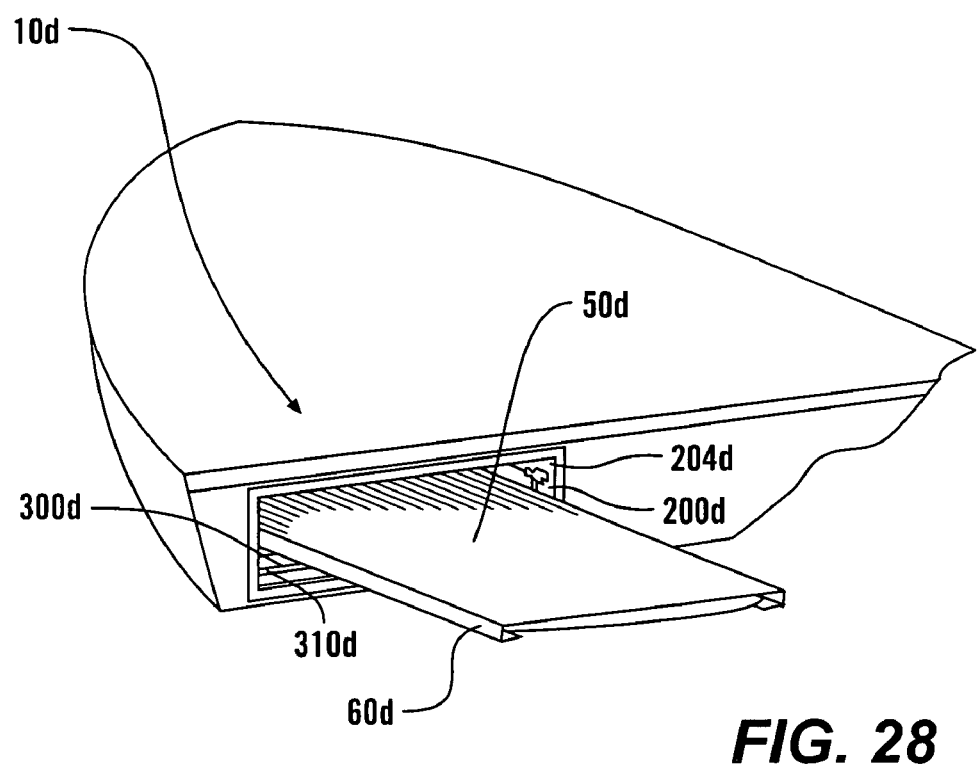
FIG. 28 is a perspective view of the alternate embodiment of FIG. 27 in a lowered position in transition between an upright and stowed position.

Referring to FIG. 28, a perspective view of the embodiment of FIG. 27 is shown in transition between a deployed position and a stowed position in which the console 50d and windshield 110d have been lowered into the compartment 204d via the console base track assembly 201d.

Figure 29:
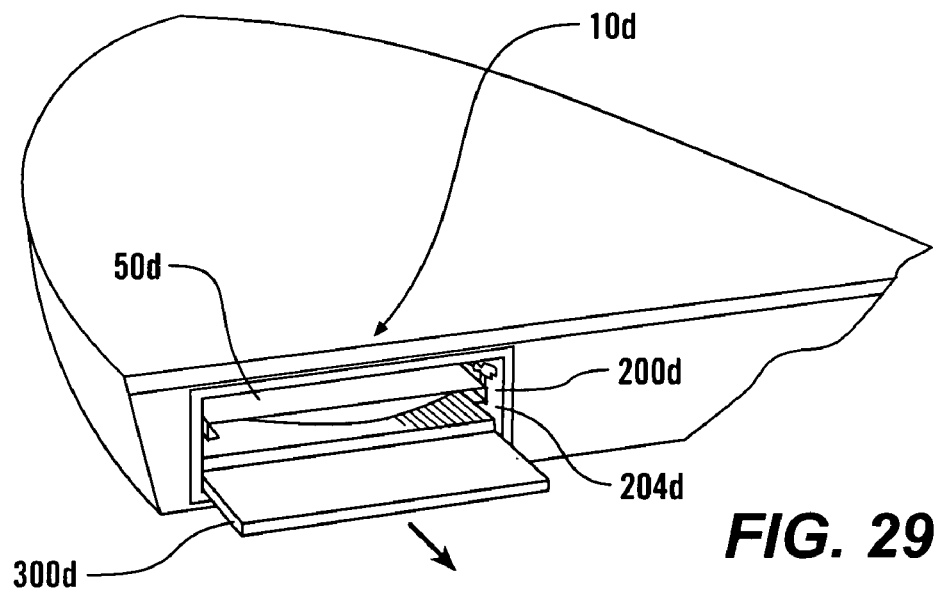
FIG. 29 is a perspective view of the alternate embodiment of FIG. 27 in a stowed position with the compartment door open.

Referring to FIG. 29, a perspective view of the embodiment of FIG. 27 is shown in a stowed position with the compartment door 300d open.

Figure 30:
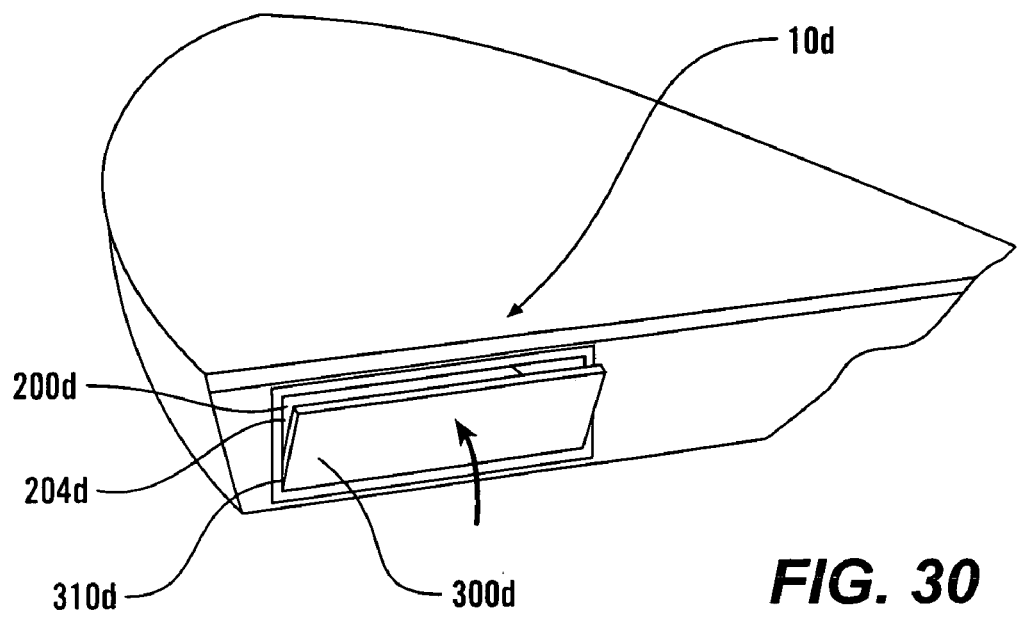
FIG. 30 is a perspective view of the alternate embodiment of FIG. 27 in a stowed position with the compartment door moved towards a closed position.

Referring to FIG. 30, a perspective view of the embodiment of FIG. 27 is shown is shown in a stowed position with the compartment door 300d in transition between an open and a closed position.

Figure 31:
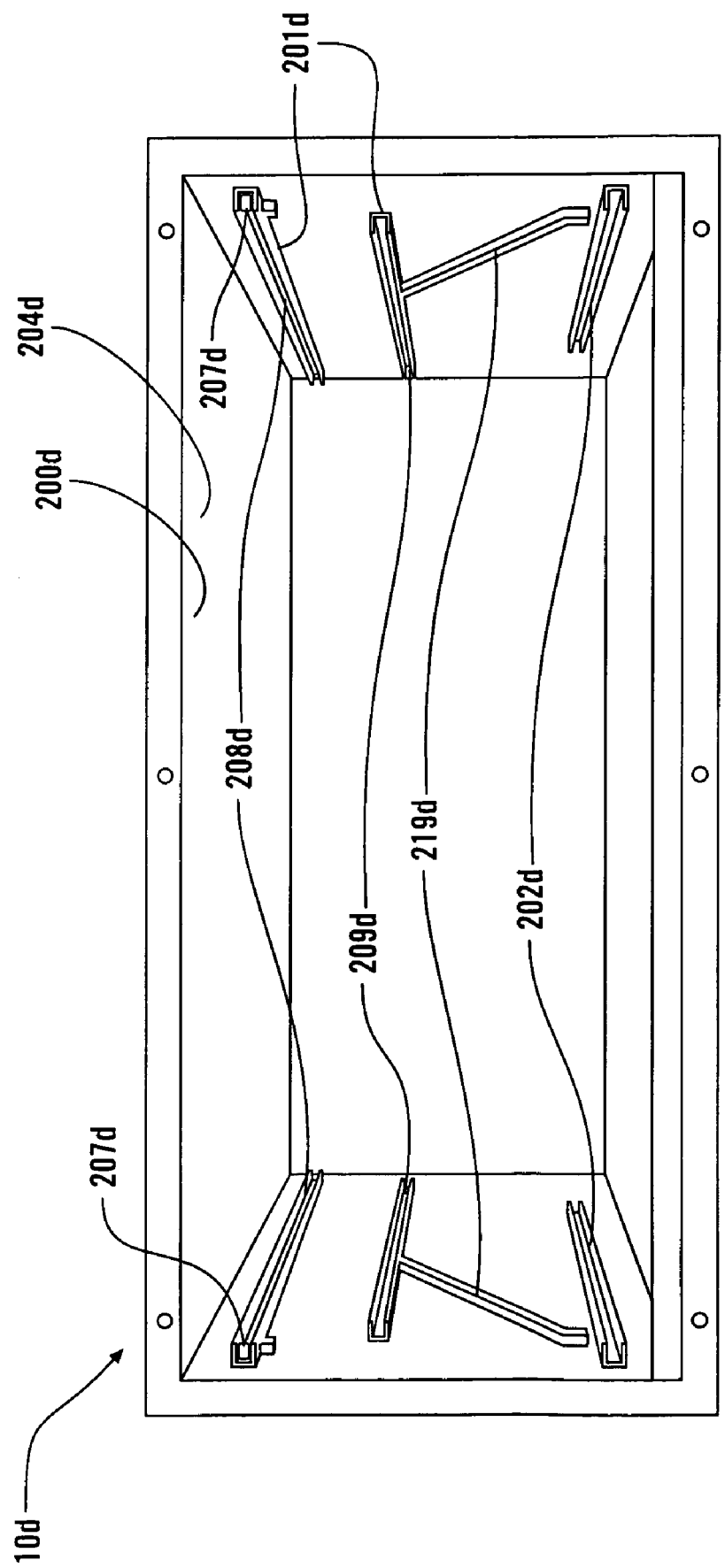
FIG. 31 is a front perspective view of the windshield housing console compartment or console base of the alternate embodiment of FIG. 27.

Referring to FIG. 31, a front perspective view of the console base track assembly 201d and compartment door track assembly 202d of the embodiment of FIG. 27 is shown. As illustrated representatively in FIG. 31, the console base 200d comprises a compartment 204d, preferably made of aluminum metal, an upper console track 208d, a lower console track 209d, and a compartment door track assembly 202d. The compartment 204d is illustrated representatively as a five-sided box secured by screws along a screw flange which runs around the perimeter of the compartment 204d. The upper and lower console tracks 208d, 209d each comprise a pair of tracks along each side of the compartment. The upper track 208d further comprises a track stop device 207d, illustrated representatively as a pair of stop track stop screws. The upper and lower track assemblies 208d, 209d are illustrated representatively as further comprising a branching channel 219d, allowing the apparatus to pivot and securing the apparatus in a deployed position, as described below.

Figure 32:
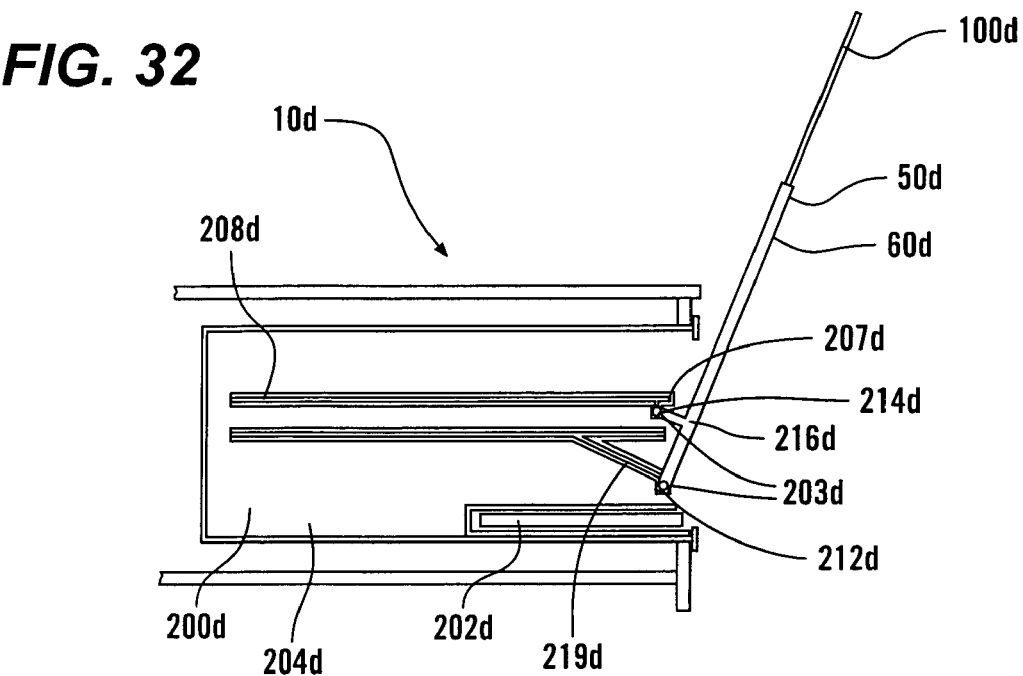
FIG. 32 is a broken away side view of the alternate embodiment of FIG. 27 in a deployed, upright position.

Referring to FIG. 32, a side view of the embodiment of FIG. 27 is shown in a deployed position. The console track securing device 203d is illustrated as a lower securing device 212d and an upper device 214d, each comprising a pair of pins connected to each side of the windshield housing console frame 60d by using a pin attachment device 216d. The upper track assembly further comprises a pin attachment device 216d, illustrated representatively as a bracket, connecting the pair of pins 214d to housing console frame 60d. The upper securing device 214d is slidably connected to the upper console base track assembly 208d and the lower securing device 212d is slidably connected to the lower console base track assembly 209d.

Figure 33:
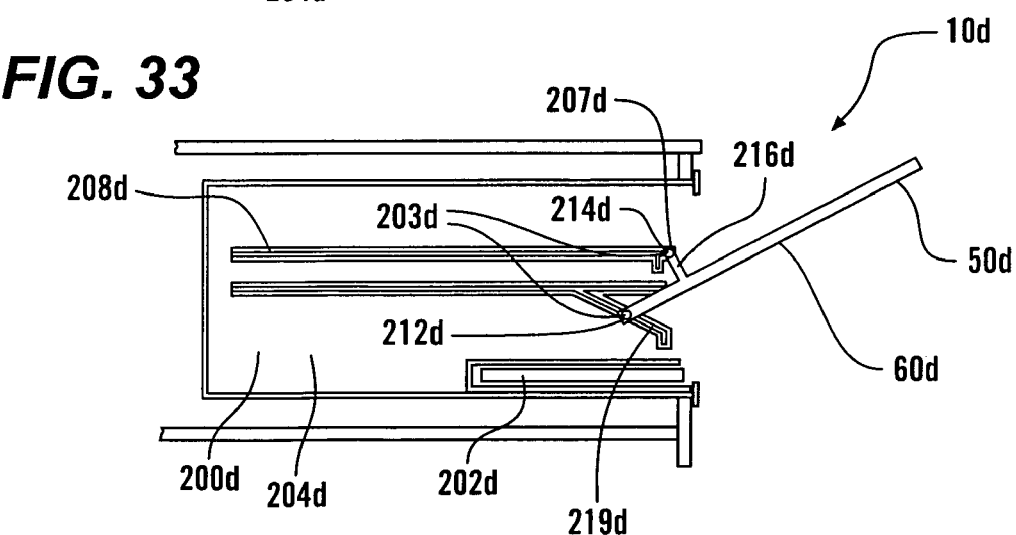
FIG. 33 is a broken away side view of the alternate embodiment of FIG. 27 in transformation between upright and stowed positions.
Figure 34:
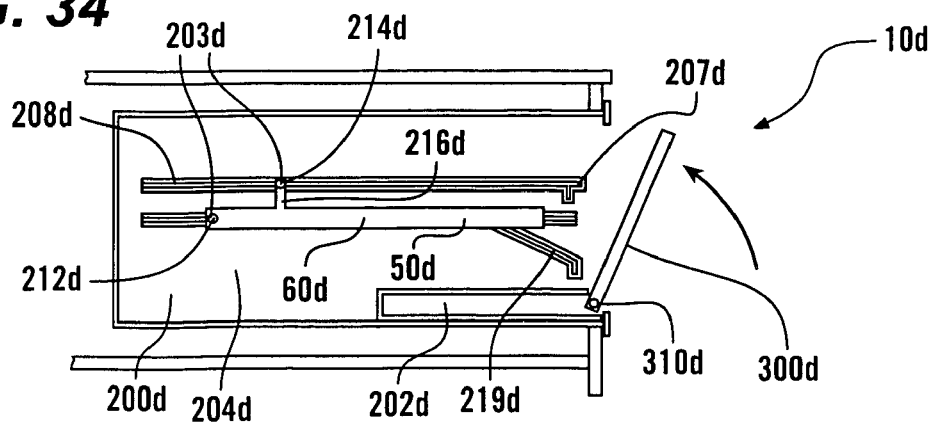
FIG. 34 is a broken away side view of the alternate embodiment of FIG. 27 in a stowed position.

As can be seen in FIGS. 32–34, the console 50d is raised from a stowed position within the compartment by pulling the console 50d forward along the upper track 208d and lower track 209d (and branching channel) on each side of the compartment and then pivoting and securing the console 50d via the track securing devices 212d, 214d connecting the console 50d to the upper and lower tracks 208d, 209d.

Referring to FIG. 33, a side view of the embodiment of FIG. 27 is shown in transition between a deployed and stowed position, with the console 50d being lowered from the deployed position.

Referring to FIG. 34, a side view of the embodiment of FIG. 27 is shown in transition between a deployed and stowed position. The console 50d has been pushed into a stowed position and the compartment door 300d is in transition between closed an open position.

Figure 35:
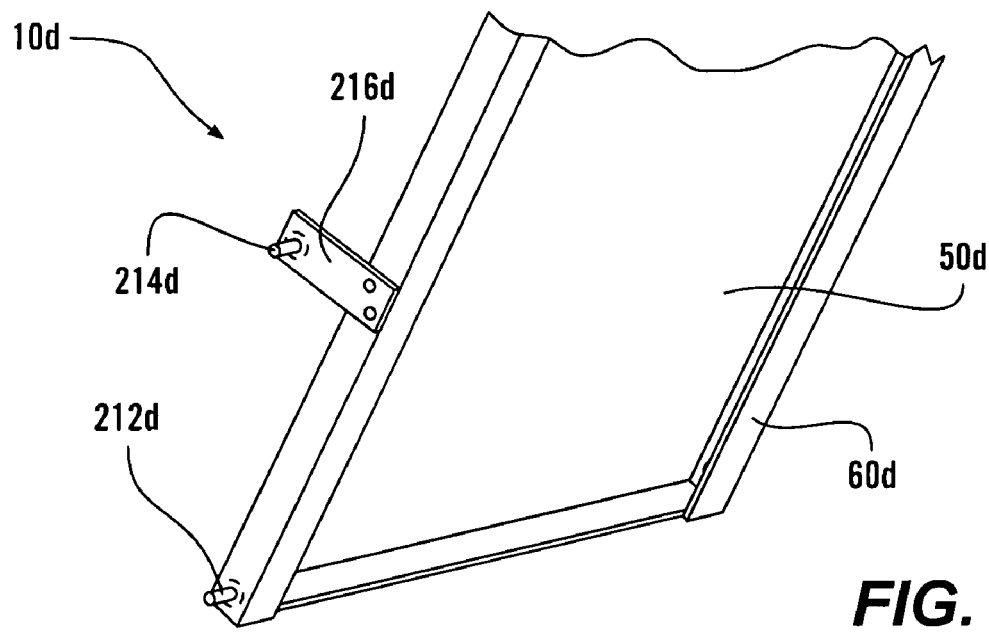
FIG. 35 is an enlarged perspective view of the pin connection between the windshield housing console and the housing console compartment or console base of the alternate embodiment of FIG. 27.

Referring to FIG. 35, an enlarged perspective view of a position of the windshield housing console 50d and console frame 60d are shown, illustrating the console securing device 203d. The upper track securing device is illustrated representatively as a pin 214d and bracket 216d assembly secured to the console frame 60d and the lower track securing device is illustrated representatively as a pin 212d secured to the console frame 60d.

Figure 36:
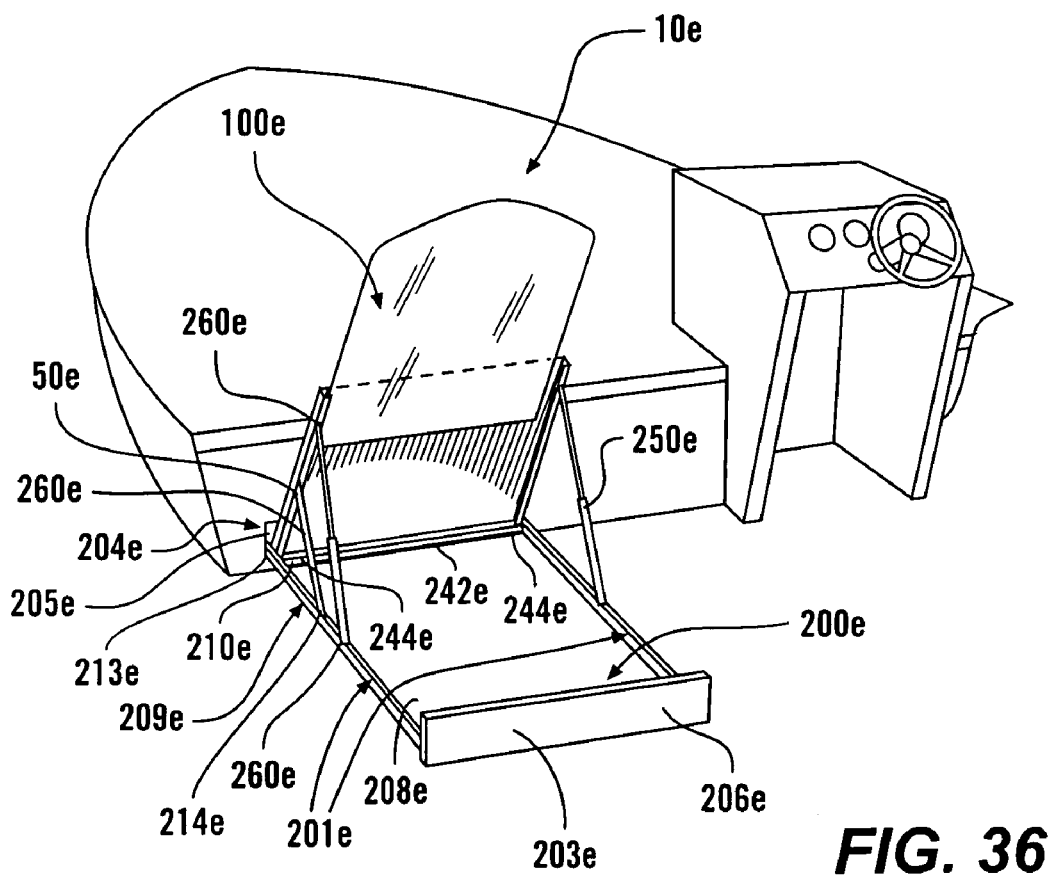
FIG. 36 is a perspective view of a fifth alternate embodiment of the retractable windshield and collapsible console in a deployed, upright position.

Referring to FIG. 36, a perspective view is shown of a fifth alternate embodiment 10e of the present invention in which the invention may be installed into a drawer compartment within the vehicle. The fifth embodiment is similar to the embodiments in FIGS. 1 and 14, with the exceptions described below. Although illustrated representatively as comprising the same deployment/supporting device and retractable windshield device as FIG. 1, the embodiment of FIG. 14 may also be used.

The embodiment 10e comprises a windshield housing console 50e, a console base 200e, a console base drawer compartment 204e, a retractable windshield device 100e, and a deployment device 250e. The console base 200e comprises a console base drawer 206e, a console base drawer sliding device 209e, and a console securing device 210e. The console base securing device 210e is similar to the console securing device used in FIG. 1, illustrated representatively as a hinge.

The console base drawer 206e further comprises two transverse members 201e, a front drawer cross member 203e, a rear drawer member 205e and a console base floor 208e. The console base 200e is secured on each side to the drawer sliding device 209e. The console base drawer sliding device 209e is illustrated representatively as further comprising a drawer track connection point 213e on each side of the drawer compartment 204e and a pair of drawer tracks 214e connected to the console base 200e.

To deploy the apparatus, the drawer or console base 200e is pulled outward from the drawer compartment 204e via the console base drawer sliding device 209e, the windshield housing console 50e and retractable windshield device are raised from the console base 200e via the deployment device 250e. A retaining device 260e such as that described in FIG. 1 may also be used to halt forward movement of the console 50e. The apparatus may be stowed by lowering the windshield device 100e and console 50e to a position substantially flat with the console base 200e, and pushing the drawer 206e in along the drawer sliding device 209e.

Although illustrated representatively in FIGS. 1–37, the windshield locking device, windshield housing console and console frame, retractable windshield device, console base, supporting and/or deployment device and the manner in which they are connected may vary, and may be of any design, shape, form or material, and as required by the user or manufacturer or the particular vehicle configuration. Additionally, the supporting device and windshield locking device may each be adjustable, allowing the user to raise each of the retractable windshield device and the windshield housing console to a desired position.

It is to be understood that the embodiment(s) herein described is/are merely illustrative of the principles of the present invention. Various modifications may be made by those skilled in the art without departing from the spirit or scope from the claims which follow.

What is claimed is:

1. A windshield apparatus comprising:
   a windshield housing console, said windshield housing console being positionable between a stowed position and a raised position; and
   a retractable windshield device, said windshield device being formed of clear, durable material and slidably secured to and retractable within and extendable from said windshield housing console; and
   said windshield device being protected by the console from exposure to weather and environmental conditions when retracted in the console stowed position, and being positioned when the console is raised and the windshield device is extended to provide forward visibility and protection for passengers from wind and exposure to environmental and weather conditions during travel in the vehicle.

2. A windshield apparatus comprising:
   a windshield housing console, said windshield housing console being positionable between a stowed and a raised position; and
   a retractable windshield device, said windshield device being formed of clear durable material and slidably secured to and retractable within and extendable from said windshield housing console; and
   a windshield housing console base, said windshield housing console being pivotally secured to said windshield housing console base; and
   said windshield device being protected by the console from exposure to weather and environmental conditions when retracted in the console stowed position, and being positioned when the console is pivoted to its raised position and the windshield device is extended to provide forward visibility and protection for passengers from wind and exposure to environmental and weather conditions during travel in the vehicle.

3. A windshield apparatus comprising:
   a windshield housing console, said windshield housing console being positionable between a raised and a stowed position; and
   a retractable windshield device, said windshield device being slidably secured to and retractable and extendable from said windshield housing console; and
   a windshield housing console base, said windshield housing console being pivotally secured to said windshield housing console base; and
   a supporting device, wherein said supporting device has a first end and a second end, said first end being secured to said console base and said second end being secured to said windshield housing console, and wherein said supporting device provides support for the apparatus when in a raised position.

4. The apparatus as claimed in claim 3, wherein said supporting device is at least one hydraulic lift, said hydraulic lift facilitating the deployment of said retractable windshield device and supporting said windshield housing console and retractable windshield device in a raised position.

5. The apparatus as claimed in claim 4, wherein said supporting device further comprises:
   a retaining device, said retaining device being connected at a first end to the windshield housing console and at a second end to the windshield housing console base and facilitating the adjustability of said deployment device according to the distance between said first and second ends of said retaining device.

6. The apparatus as claimed in claim 2, wherein said windshield housing console rests in a substantially parallel or flat position above said console base when in a stowed position.

7. The apparatus as claimed in claim 3, wherein the supporting device is at least one supporting leg secured to the windshield housing console and extending to said base.

8. The apparatus as claimed in claim 7, wherein said supporting device is adjustable via a pivotal connection between said windshield housing console and said supporting device.

9. The apparatus as claimed in claim 7, wherein said apparatus further comprises: a windshield locking device.

10. The apparatus as claimed in claim 9, wherein said windshield locking device comprises at least one pair of lock blocks for retaining and releasing the windshield from raised and lowered positions relative to the windshield housing console, wherein a first lock block is fixably secured to said windshield and a second lock block is fixably secured to said windshield housing console.

11. The apparatus as claimed in claim 9, wherein said windshield locking device is adjustable via two or more windshield locking devices.

12. The apparatus of claim 2, further comprising:
   a console base compartment, wherein said windshield housing console base rests in a stowed position within said compartment when not in use.

13. The apparatus as claimed in claim 2, wherein said windshield housing console base is a compartment, said windshield housing console being pivotally connected to said compartment.

14. A windshield apparatus comprising:
   a windshield housing console, said windshield housing console being positionable between a raised and a stowed position; and
   a retractable windshield device said windshield device being slidably secured to and retractable and extendable from said windshield housing console; and a windshield housing console base comprising a compartment, said windshield housing console being pivotally secured to said compartment; and a console base compartment door, said door being pivotally secured to said compartment.

15. The apparatus as claimed in claim 14, wherein said compartment door supports said windshield housing console in a raised position by lowering said compartment door down until it contacts said windshield housing console.

16. A windshield apparatus comprising:

a windshield housing console, said windshield housing console being positionable between a raised and a stowed position; and a retractable windshield device, said windshield device being slidably secured to and retractable and extendable from said windshield housing console; and a windshield housing console base comprising a compartment, said windshield housing console being pivotally secured to said compartment; and a compartment track assembly, wherein said compartment track assembly allows the windshield housing console to pivot and slide within the compartment between raised and stowed positions.

17. The apparatus of claim 16, further comprising:

a compartment door, said compartment door being pivotally secured to said compartment.

18. A windshield apparatus comprising:

a windshield housing console, said windshield housing console being positionable between a raised and a stowed position; and a retractable windshield device said windshield device being slidably secured to and retractable and extendable from said windshield housing console; and a windshield housing console base comprising a compartment, said windshield housing console being pivotally secured to said compartment; and a drawer track assembly, said windshield housing console base being extendable from said compartment via said drawer track assembly.

* * * * *